(12) United States Patent
Zhamu et al.

(10) Patent No.: US 9,960,451 B1
(45) Date of Patent: May 1, 2018

(54) METHOD OF PRODUCING DEFORMABLE QUASI-SOLID ELECTRODE MATERIAL FOR ALKALI METAL BATTERIES

(71) Applicant: Nanotek Instruments, Inc., Dayton, OH (US)

(72) Inventors: Aruna Zhamu, Springboro, OH (US); Bor Z. Jang, Centerville, OH (US)

(73) Assignee: Nanotek Instruments, Inc., Dayton, OH (US)

(*) Notice: Subject to any disclaimer, the term of this patent is extended or adjusted under 35 U.S.C. 154(b) by 0 days. days.

(21) Appl. No.: 15/604,606

(22) Filed: May 24, 2017

(51) Int. Cl.
| | |
|---|---|
| *H01M 10/0585* | (2010.01) |
| *H01M 10/052* | (2010.01) |
| *H01M 4/36* | (2006.01) |
| *H01M 4/50* | (2010.01) |
| *H01M 4/58* | (2010.01) |
| *H01M 4/583* | (2010.01) |
| *H01M 4/60* | (2006.01) |
| *H01M 4/525* | (2010.01) |
| *H01M 10/0564* | (2010.01) |
| *H01M 4/48* | (2010.01) |

(52) U.S. Cl.
CPC ....... *H01M 10/0585* (2013.01); *H01M 4/366* (2013.01); *H01M 4/483* (2013.01); *H01M 4/502* (2013.01); *H01M 4/525* (2013.01); *H01M 4/581* (2013.01); *H01M 4/583* (2013.01); *H01M 4/5815* (2013.01); *H01M 4/5825* (2013.01); *H01M 4/60* (2013.01); *H01M 10/052* (2013.01); *H01M 10/0564* (2013.01); *H01M 2300/0065* (2013.01)

(58) Field of Classification Search
CPC .......................... H01M 10/0585; H01M 4/366
See application file for complete search history.

(56) References Cited

U.S. PATENT DOCUMENTS

2005/0271574 A1  12/2005  Jang et al.

*Primary Examiner* — Olatunji Godo

(57) ABSTRACT

A method of preparing an alkali metal cell having a quasi-solid electrode, the method comprising: (a) combining a quantity of an active material, a quantity of an electrolyte, and a conductive additive to form a deformable and electrically conductive electrode material, wherein the conductive additive, containing conductive filaments, forms a 3D network of electron-conducting pathways; (b) forming the electrode material into a quasi-solid electrode, wherein the forming step includes deforming the electrode material into an electrode shape without interrupting the 3D network of electron-conducting pathways such that the electrode maintains an electrical conductivity no less than $10^{-6}$ S/cm; (c) forming a second electrode; and (d) forming an alkali metal cell by combining the quasi-solid electrode and the second electrode having an ion-conducting separator disposed between the two electrodes.

39 Claims, 14 Drawing Sheets

METHOD OF PRODUCING DEFORMABLE QUASI-SOLID ELECTRODE MATERIAL FOR ALKALI METAL BATTERIES

FIELD OF THE INVENTION

The present invention relates generally to the field of alkali metal batteries, including rechargeable lithium metal batteries, sodium metal batteries, lithium-ion batteries, sodium-ion batteries, lithium-ion capacitors and sodium-ion capacitors.

BACKGROUND OF THE INVENTION

Historically, today's most favorite rechargeable energy storage devices—lithium-ion batteries—actually evolved from rechargeable "lithium metal batteries" using lithium (Li) metal or Li alloy as the anode and a Li intercalation compound as the cathode. Li metal is an ideal anode material due to its light weight (the lightest metal), high electronegativity (−3.04 V vs. the standard hydrogen electrode), and high theoretical capacity (3,860 mAh/g). Based on these outstanding properties, lithium metal batteries were proposed 40 years ago as an ideal system for high energy-density applications. During the mid-1980s, several prototypes of rechargeable Li metal batteries were developed. A notable example was a battery composed of a Li metal anode and a molybdenum sulfide cathode, developed by MOLI Energy, Inc. (Canada). This and several other batteries from different manufacturers were abandoned due to a series of safety problems caused by sharply uneven Li growth (formation of Li dendrites) as the metal was re-plated during each subsequent recharge cycle. As the number of cycles increases, these dendritic or tree-like Li structures could eventually traverse the separator to reach the cathode, causing internal short-circuiting.

To overcome these safety issues, several alternative approaches were proposed in which either the electrolyte or the anode was modified. One approach involved replacing Li metal by graphite (another Li insertion material) as the anode. The operation of such a battery involves shuttling Li ions between two Li insertion compounds, hence the name "Li-ion battery." Presumably because of the presence of Li in its ionic rather than metallic state, Li-ion batteries are inherently safer than Li-metal batteries.

Lithium ion battery is a prime candidate energy storage device for electric vehicle (EV), renewable energy storage, and smart grid applications. The past two decades have witnessed a continuous improvement in Li-ion batteries in terms of energy density, rate capability, and safety, and somehow the significantly higher energy density Li metal batteries have been largely overlooked. However, the use of graphite-based anodes in Li-ion batteries has several significant drawbacks: low specific capacity (theoretical capacity of 372 mAh/g as opposed to 3,860 mAh/g for Li metal), long Li intercalation time (e.g. low solid-state diffusion coefficients of Li in and out of graphite and inorganic oxide particles) requiring long recharge times (e.g. 7 hours for electric vehicle batteries), inability to deliver high pulse power (power density <<1 kW/kg), and necessity to use pre-lithiated cathodes (e.g. lithium cobalt oxide), thereby limiting the choice of available cathode materials. Further, these commonly used cathodes have a relatively low specific capacity (typically <200 mAh/g). These factors have contributed to the two major shortcomings of today's Li-ion batteries—low gravimetric and volumetric energy densities (typically 150-220 Wh/kg and 450-600 Wh/L) and low power densities (typically <0.5 kW/kg and <1.0 kW/L), all based on the total battery cell weight or volume.

The emerging EV and renewable energy industries demand the availability of rechargeable batteries with a significantly higher gravimetric energy density (e.g. demanding >>250 Wh/kg and, preferably, >>300 Wh/kg) and higher power density (shorter recharge times) than what the current Li ion battery technology can provide. Furthermore, the microelectronics industry is in need of a battery having a significantly larger volumetric energy density (>650 Wh/L, preferably >750 Wh/L) since consumers demand to have smaller-volume and more compact portable devices (e.g. smart phones and tablets) that store more energy. These requirements have triggered considerable research efforts on the development of electrode materials with a higher specific capacity, excellent rate capability, and good cycle stability for lithium ion batteries.

Several elements from Group III, IV, and V in the periodic table can form alloys with Li at certain desired voltages. Therefore, various anode materials based on such elements and some metal oxides have been proposed for lithium ion batteries. Among these, silicon has been recognized as one of the next-generation anode materials for high-energy lithium ion batteries since it has a nearly 10 times higher theoretical gravimetric capacity than graphite 3,590 mAh/g based on $Li_{3.75}Si$ vs. 372 mAh/g for $LiC_6$) and ~3 times larger volumetric capacities. However, the dramatic volume changes (up to 380%) of Si during lithium ion alloying and de-alloying (cell charge and discharge) often led to severe and rapid battery performance deterioration. The performance fade is mainly due to the volume change-induced pulverization of Si and the inability of the binder/conductive additive to maintain the electrical contact between the pulverized Si particles and the current collector. In addition, the intrinsic low electric conductivity of silicon is another challenge that needs to be addressed.

Although several high-capacity anode active materials have been found (e.g., Si), there has been no corresponding high-capacity cathode material available. Current cathode active materials commonly used in Li-ion batteries have the following serious drawbacks:

(1) The practical capacity achievable with current cathode materials (e.g. lithium iron phosphate and lithium transition metal oxides) has been limited to the range of 150-250 mAh/g and, in most cases, less than 200 mAh/g.

(2) The insertion and extraction of lithium in and out of these commonly used cathodes rely upon extremely slow solid-state diffusion of Li in solid particles having very low diffusion coefficients (typically $10^{-8}$ to $10^{-14}$ cm$^2$/s), leading to a very low power density (another long-standing problem of today's lithium-ion batteries).

(3) The current cathode materials are electrically and thermally insulating, not capable of effectively and efficiently transporting electrons and heat. The low electrical conductivity means high internal resistance and the necessity to add a large amount of conductive additives, effectively reducing the proportion of electrochemically active material in the cathode that already has a low capacity. The low thermal conductivity also implies a higher tendency to undergo thermal runaway, a major safety issue in lithium battery industry.

Low-capacity anode or cathode active materials are not the only problem that the lithium-ion battery industry faces. There are serious design and manufacturing issues that the lithium-ion battery industry does not seem to be aware of, or has largely ignored. For instance, despite the high gravimetric capacities at the electrode level (based on the anode or cathode active material weight alone) as frequently claimed in open literature and patent documents, these electrodes unfortunately fail to provide batteries with high capacities at the battery cell or pack level (based on the total battery cell weight or pack weight). This is due to the notion that, in these reports, the actual active material mass loadings of the electrodes are too low. In most cases, the active material mass loadings of the anode (areal density) is significantly lower than 15 mg/cm$^2$ and mostly <8 mg/cm$^2$ (areal density=the amount of active materials per electrode cross-sectional area along the electrode thickness direction). The cathode active material amount is typically 1.5-2.5 times higher than the anode active material. As a result, the weight proportion of the anode active material (e.g. graphite or carbon) in a lithium-ion battery is typically from 12% to 17%, and that of the cathode active material (e.g. $LiMn_2O_4$) from 17% to 35% (mostly <30%). The weight fraction of the cathode and anode active materials combined is typically from 30% to 45% of the cell weight.

As a totally distinct class of energy storage device, sodium batteries have been considered as an attractive alternative to lithium batteries since sodium is abundant and the production of sodium is significantly more environmentally benign compared to the production of lithium. In addition, the high cost of lithium is a major issue.

Sodium ion batteries using a hard carbon-based anode (Na-carbon intercalation compound) and a sodium transition metal phosphate as a cathode have been described by several research groups. However, these sodium-based devices exhibit even lower specific energies and rate capabilities than Li-ion batteries. These conventional sodium-ion batteries require sodium ions to diffuse in and out of a sodium intercalation compound at both the anode and the cathode. The required solid-state diffusion processes for sodium ions in a sodium-ion battery are even slower than the Li diffusion processes in a Li-ion battery, leading to excessively low power densities.

Instead of hard carbon or other carbonaceous intercalation compound, sodium metal may be used as the anode active material in a sodium metal cell. However, the use of metallic sodium as the anode active material is normally considered undesirable and dangerous because of dendrite formation, interface aging, and electrolyte incompatibility problems. Most significantly, the same flammable solvents previously used for lithium secondary batteries are also used in most of the sodium metal or sodium-ion batteries.

The low active material mass loading is primarily due to the inability to obtain thicker electrodes (thicker than 100-200 μm) using the conventional slurry coating procedure. This is not a trivial task as one might think, and in reality the electrode thickness is not a design parameter that can be arbitrarily and freely varied for the purpose of optimizing the cell performance. Contrarily, thicker samples tend to become extremely brittle or of poor structural integrity and would also require the use of large amounts of binder resin. The low areal densities and low volume densities (related to thin electrodes and poor packing density) result in a relatively low volumetric capacity and low volumetric energy density of the battery cells.

With the growing demand for more compact and portable energy storage systems, there is keen interest to increase the utilization of the volume of the batteries. Novel electrode materials and designs that enable high volumetric capacities and high mass loadings are essential to achieving improved cell volumetric capacities and energy densities.

Therefore, there is clear and urgent need for lithium and sodium batteries that have high active material mass loading (high areal density), high electrode thickness without significantly decreasing the electron and ion transport rates (e.g. with improved conductivity), high capacity, high power density, and high energy density. These batteries must be produced in an environmentally benign manner.

SUMMARY OF THE INVENTION

The present invention provides a method of producing a lithium battery or sodium battery having a high active material mass loading, exceptionally low overhead weight and volume (relative to the active material mass and volume), high capacity, and unprecedentedly high energy density and power density. This lithium or sodium battery can be a primary battery (non-rechargeable) or a secondary battery (rechargeable), including a rechargeable lithium or sodium metal battery (having a lithium or sodium metal anode) and a lithium-ion or sodium-ion battery (e.g. having a first lithium intercalation compound as an anode active material and a second lithium intercalation or absorbing compound, having a much higher electrochemical potential than the first one, as a cathode active material). This alkali battery also includes lithium-ion capacitor and sodium-ion capacitor, wherein the anode is a lithium-ion or sodium-ion cell type of anode and the cathode is a supercapacitor cathode (e.g. activated carbon or graphene sheets as an active material for use in an electric double layer capacitor or a redox pseudo-capacitor).

The embodiments of the present invention include a method of preparing an alkali metal cell having a quasi-solid electrode, the method comprising: (a) combining a quantity of an active material (an anode active material or a cathode active material), a quantity of an electrolyte, and a conductive additive to form a deformable and electrically conductive electrode material, wherein the conductive additive, containing conductive filaments, forms a 3D network of electron-conducting pathways; (b) forming the electrode material into a quasi-solid electrode, wherein the forming step includes deforming the electrode material into an electrode shape without interrupting the 3D network of electron-conducting pathways such that the electrode maintains an electrical conductivity no less than $10^{-6}$ S/cm (preferably no less than $10^{-5}$ S/cm, more preferably no less than $10^{-3}$ S/cm, further preferably no less than $10^{-2}$ S/cm, still more preferably and typically no less than $10^{-1}$ S/cm, even more typically and preferably no less than 1 S/cm, and further more typically and preferably no less than 10 S/cm and up to 300 S/cm); (c) forming a second electrode (the second electrode may be a quasi-solid electrode as well); and (d) forming an alkali metal cell by combining the quasi-solid electrode and the second electrode having an ion-conducting separator disposed between the two electrodes.

The electrolyte may be a quasi-solid electrolyte containing a lithium salt or sodium salt dissolved in a liquid solvent with a salt concentration from 2.5 M to 14 M; preferably greater than 3 M, more preferably greater than 3.5 M, further preferably greater than 5 M, still more preferably greater than 7 M, and even more preferably greater than 10 M. With a salt concentration no less than 2.5 M, the electrolyte is no longer a liquid electrolyte; instead, it is a quasi-solid electrolyte. In certain embodiments, the electrolyte is a quasi-solid electrolyte containing a lithium salt or sodium salt dissolved in a liquid solvent with a salt concentration from 3.0 M to 11 M.

In certain embodiments, the conductive filaments are selected from carbon fibers, graphite fibers, carbon nanofibers, graphite nanofibers, carbon nanotubes, needle coke, carbon whiskers, conductive polymer fibers, conductive material-coated fibers, metal nanowires, metal fibers, metal wires, graphene sheets, expanded graphite platelets, a combination thereof, or a combination thereof with non-filamentary conductive particles.

In certain embodiments, the electrode maintains an electrical conductivity from $10^{-5}$ S/cm to about 1 S/cm.

In certain embodiments, the deformable electrode material has an apparent viscosity of no less than about 10,000 Pa-s measured at an apparent shear rate of 1,000 $s^{-1}$. In certain embodiments, the deformable electrode material has an apparent viscosity of no less than about 100,000 Pa-s at an apparent shear rate of 1,000 $s^{-1}$.

In the method, the quantity of the active material is typically from about 20% to about 95% by volume of the electrode material, more typically from about 35% to about 85% by volume of the electrode material, and most typically from about 50% to about 75% by volume of the electrode material.

Preferably, the step of combining active material, conductive additive, and electrolyte (including dissolving a lithium or sodium salt in a liquid solvent) follows a specific sequence. This step includes first dispersing the conductive filaments into a liquid solvent to form a homogeneous suspension, followed by adding the active material in the suspension and dissolving a lithium salt or sodium salt in the liquid solvent of the suspension. In other words, the conductive filaments must be uniformly dispersed in the liquid solvent first prior to adding other ingredients, such as active material, and prior to dissolving the lithium salt or sodium salt in the solvent. This sequence is essential to achieving percolation of conducting filaments for forming a 3D network of electron-conducting pathways. Without following such a sequence, the percolation of conducting filaments may not occur or occur only when an excessively large proportion of conducting filaments (e.g. >10% by volume) is added, which would reduce the fraction of active material and thus reduce the energy density of the cell.

In certain embodiments, the steps of combining and forming the electrode material into a quasi-solid electrode include dissolving a lithium salt or sodium salt in a liquid solvent to form an electrolyte having a first salt concentration and subsequently removing portion of the liquid solvent to increase the salt concentration to obtain a quasi-solid electrolyte having a second salt concentration, which is higher than the first concentration and preferably higher than 2.5 M (and more preferably from 3.0 M to 14 M).

The step of removing portion of solvent may be conducted in such a manner that it does not cause precipitation or crystallization of the salt and that the electrolyte is in a supersaturated state. In certain preferred embodiments, the liquid solvent contains a mixture of at least a first liquid solvent and a second liquid solvent and the first liquid solvent is more volatile than the second liquid solvent, wherein the step of removing portion of the liquid solvent includes partially or fully removing the first liquid solvent.

There is no restriction on the types of anode active materials or cathode active materials that can be used in practicing the instant invention. However, preferably, the anode active material absorbs lithium ions at an electrochemical potential of less than 1.0 volt (preferably less than 0.7 volts) above the $Li/Li^+$ (i.e. relative to $Li \rightarrow Li^+ + e^-$ as the standard potential) when the battery is charged.

In certain preferred embodiments, the anode active material is selected from the group consisting of: (a) Particles of lithium metal or a lithium metal alloy; (b) Natural graphite particles, artificial graphite particles, meso-carbon microbeads (MCMB), carbon particles (including soft carbon and hard carbon), needle coke, carbon nanotubes, carbon nanofibers, carbon fibers, and graphite fibers; (c) Silicon (Si), germanium (Ge), tin (Sn), lead (Pb), antimony (Sb), bismuth (Bi), zinc (Zn), aluminum (Al), nickel (Ni), cobalt (Co), manganese (Mn), titanium (Ti), iron (Fe), and cadmium (Cd); (d) Alloys or intermetallic compounds of Si, Ge, Sn, Pb, Sb, Bi, Zn, Al, or Cd with other elements, wherein said alloys or compounds are stoichiometric or non-stoichiometric; (e) Oxides, carbides, nitrides, sulfides, phosphides, selenides, and tellurides of Si, Ge, Sn, Pb, Sb, Bi, Zn, Al, Fe, Ni, Co, Ti, Mn, or Cd, and their mixtures or composites; (f) Pre-lithiated versions thereof; (g) Pre-lithiated graphene sheets; and combinations thereof.

In certain embodiments, the alkali metal cell is a sodium metal cell or sodium-ion cell and the active material is an anode active material containing a sodium intercalation compound selected from petroleum coke, carbon black, amorphous carbon, activated carbon, hard carbon (carbon that is difficult to graphitize), soft carbon (carbon that can be readily graphitized), templated carbon, hollow carbon nanowires, hollow carbon sphere, titanates, $NaTi_2(PO_4)_3$, $Na_2Ti_3O_7$, $Na_2C_8H_4O_4$, $Na_2TP$, $Na_xTiO_2$ (x=0.2 to 1.0), $Na_2C_8H_4O_4$, carboxylate based materials, $C_8H_4Na_2O_4$, $C_8H_6O_4$, $C_8H_5NaO_4$, $C_8Na_2F_4O_4$, $C_{10}H_2Na_4O_8$, $C_{14}H_4O_6$, $C_{14}H_4Na_4O_8$, or a combination thereof.

In certain embodiments, the alkali metal cell is a sodium metal cell or sodium-ion cell and the active material is an anode active material selected from the group consisting of: (a) Particles of sodium metal or a sodium metal alloy; (b) Natural graphite particles, artificial graphite particles, meso-carbon microbeads (MCMB), carbon particles, needle coke, carbon nanotubes, carbon nanofibers, carbon fibers, and graphite fibers; (c) Sodium-doped silicon (Si), germanium (Ge), tin (Sn), lead (Pb), antimony (Sb), bismuth (Bi), zinc (Zn), aluminum (Al), titanium (Ti), cobalt (Co), nickel (Ni), manganese (Mn), cadmium (Cd), and mixtures thereof; (d) Sodium-containing alloys or intermetallic compounds of Si, Ge, Sn, Pb, Sb, Bi, Zn, Al, Ti, Co, Ni, Mn, Cd, and their mixtures; (e) Sodium-containing oxides, carbides, nitrides, sulfides, phosphides, selenides, tellurides, or antimonides of Si, Ge, Sn, Pb, Sb, Bi, Zn, Al, Fe, Ti, Co, Ni, Mn, Cd, and mixtures or composites thereof; (f) Sodium salts; and (g) Graphene sheets pre-loaded with sodium ions; and combinations thereof.

In certain embodiments, the alkali metal cell is a sodium metal cell or sodium-ion cell and the active material is a cathode active material containing a sodium intercalation compound or sodium-absorbing compound selected from an inorganic material, an organic or polymeric material, a metal oxide/phosphate/sulfide, or a combination thereof. The metal oxide/phosphate/sulfide may be selected from a sodium cobalt oxide, sodium nickel oxide, sodium manganese oxide, sodium vanadium oxide, sodium-mixed metal oxide, sodium/potassium-transition metal oxide, sodium iron phosphate, sodium/potassium iron phosphate, sodium manganese phosphate, sodium/potassium manganese phosphate, sodium vanadium phosphate, sodium/potassium vanadium phosphate, sodium mixed metal phosphate, transition metal sulfide, or a combination thereof.

The inorganic material may be selected from sulfur, sulfur compound, lithium polysulfide, transition metal dichalcogenide, a transition metal trichalcogenide, or a combination thereof. In certain embodiments, the inorganic material is selected from $TiS_2$, $TaS_2$, $MoS_2$, $NbSe_3$, $MnO_2$, $CoO_2$, an iron oxide, a vanadium oxide, or a combination thereof.

In some embodiments, the alkali metal cell is a sodium metal cell or sodium-ion cell and the active material is a cathode active material containing a sodium intercalation compound selected from $NaFePO_4$, $Na_{(1-x)}K_xPO_4$, $Na_{0.7}FePO_4$, $Na_{1.5}VOPO_4F_{0.5}$, $Na_3V_2(PO_4)_3$, $Na_3V_2(PO_4)_2F_3$, $Na_2FePO_4F$, $NaFeF_3$, $NaVPO_4F$, $Na_3V_2(O_4)_2F_3$, $Na_{1.5}VOPO_4F_{0.5}$, $Na_3V_2(PO_4)_3$, $NaV_6O_{15}$, $Na_xVO_2$, $Na_{0.33}V_2O_5$, $Na_xCoO_2$, $Na_{2/3}[Ni_{1/3}Mn_{2/3}]O_2$, $Na_x(Fe_{1/2}Mn_{1/2})O_2$, $Na_xMnO_2$, $\lambda$-$MnO_2$, $Na_xK_{(1-x)}MnO_2$, $Na_{0.44}MnO_2$, $Na_{0.44}MnO_2/C$, $Na_4Mn_9O_{18}$, $NaFe_2Mn(PO_4)_3$, $Na_2Ti_3O_7$, $Ni_{1/3}Mn_{1/3}CO_{13}O_2$, $Cu_{0.56}Ni_{0.44}HCF$, $NiHCF$, $Na_xMnO_2$, $NaCrO_2$, $Na_3Ti_2(PO_4)_3$, $NiCo_2O_4$, $Ni_3S_2/FeS_2$, $Sb_2O_4$, $Na_4Fe(CN)_6/C$, $NaV_{1-x}Cr_xPO_4F$, $Se_zS_y$ (y/z=0.01 to 100), Se, Alluaudites, or a combination thereof, wherein x is from 0.1 to 1.0.

In some preferred embodiments, the cathode active material contains a lithium intercalation compound selected from the group consisting of lithium cobalt oxide, doped lithium cobalt oxide, lithium nickel oxide, doped lithium nickel oxide, lithium manganese oxide, doped lithium manganese oxide, lithium vanadium oxide, doped lithium vanadium oxide, lithium mixed-metal oxides, lithium iron phosphate, lithium vanadium phosphate, lithium manganese phosphate, lithium mixed-metal phosphates, metal sulfides, and combinations thereof.

The electrolytes can be an aqueous liquid, organic liquid, ionic liquid (ionic salt having a melting temperature lower than 100° C., preferably lower than room temperature, 25° C.), or a mixture of an ionic liquid and an organic liquid at a ratio from 1/100 to 100/1. The organic liquid is desirable, but the ionic liquid is preferred.

In a preferred embodiment, the quasi-solid electrode has a thickness from 200 μm to 1 cm, preferably from 300 μm to 0.5 cm (5 mm), further preferably from 400 μm to 3 mm, and most preferably from 500 μm to 2.5 mm (2,500 μm). If the active material is an anode active material, the anode active material has a mass loading no less than 25 mg/cm$^2$ (preferably no less than 30 mg/cm$^2$, and more preferably no less than 35 mg/cm$^2$) and/or occupies at least 25% (preferably at least 30% and more preferably at least 35%) by weight or by volume of the entire battery cell. If the active material is a cathode active material, the cathode active material preferably has a mass loading no less than 20 mg/cm$^2$ (preferably no less than 25 mg/cm$^2$ and more preferably no less than 30 mg/cm$^2$) for an organic or polymer material or no less than 45 mg/cm$^2$ (preferably no less than 50 mg/cm$^2$ and more preferably no less than 55 mg/cm$^2$) for an inorganic and non-polymer material in the cathode and/or occupies at least 45% (preferably at least 50% and more preferably at least 55%) by weight or by volume of the entire battery cell.

The aforementioned requirements on electrode thickness, the anode active material areal mass loading or mass fraction relative to the entire battery cell, or the cathode active material areal mass loading or mass fraction relative to the entire battery cell have not been possible with conventional lithium or sodium batteries using the conventional slurry coating and drying process.

In some embodiments, the anode active material is a pre-lithiated version of graphene sheets selected from pristine graphene, graphene oxide, reduced graphene oxide, graphene fluoride, graphene chloride, graphene bromide, graphene iodide, hydrogenated graphene, nitrogenated graphene, boron-doped graphene, nitrogen-doped graphene, chemically functionalized graphene, a physically or chemically activated or etched version thereof, or a combination thereof. Surprisingly, without pre-lithiation, the resulting lithium battery cell does not exhibit a satisfactory cycle life (i.e. capacity decays rapidly).

In some embodiments of the invented method, the cell is a lithium metal cell or lithium-ion cell containing a cathode active material selected from a lithium intercalation compound or lithium-absorbing compound is selected from an inorganic material, an organic or polymeric material, a metal oxide/phosphate/sulfide, or a combination thereof. For example, the metal oxide/phosphate/sulfide may be selected from a lithium cobalt oxide, lithium nickel oxide, lithium manganese oxide, lithium vanadium oxide, lithium-mixed metal oxide, lithium iron phosphate, lithium manganese phosphate, lithium vanadium phosphate, lithium mixed metal phosphate, transition metal sulfide, or a combination thereof. The inorganic material is selected from sulfur, sulfur compound, lithium polysulfide, transition metal dichalcogenide, a transition metal trichalcogenide, or a combination thereof. In particular, the inorganic material is selected from $TiS_2$, $TaS_2$, $MoS_2$, $NbSe_3$, $MnO_2$, $CoO_2$, an iron oxide, a vanadium oxide, or a combination thereof. These will be further discussed later.

In this lithium metal battery, the cathode active material contains a lithium intercalation compound selected from a metal carbide, metal nitride, metal boride, metal dichalcogenide, or a combination thereof. In some embodiments, the cathode active material contains a lithium intercalation compound selected from an oxide, dichalcogenide, trichalcogenide, sulfide, selenide, or telluride of niobium, zirconium, molybdenum, hafnium, tantalum, tungsten, titanium, vanadium, chromium, cobalt, manganese, iron, or nickel in a nanowire, nano-disc, nano-ribbon, or nano platelet form. Preferably, the cathode active material contains a lithium intercalation compound selected from nano discs, nano platelets, nano-coating, or nano sheets of an inorganic material selected from: (a) bismuth selenide or bismuth telluride, (b) transition metal dichalcogenide or trichalcogenide, (c) sulfide, selenide, or telluride of niobium, zirconium, molybdenum, hafnium, tantalum, tungsten, titanium, cobalt, manganese, iron, nickel, or a transition metal; (d) boron nitride, or (e) a combination thereof; wherein said discs, platelets, or sheets have a thickness less than 100 nm.

In some embodiments, the cathode active material in this lithium metal battery is an organic material or polymeric material selected from Poly(anthraquinonyl sulfide) (PAQS), a lithium oxocarbon, 3,4,9,10-perylenetetracarboxylic dianhydride (PTCDA), poly(anthraquinonyl sulfide), pyrene-4,5,9,10-tetraone (PYT), polymer-bound PYT, Quino(triazene), redox-active organic material, Tetracyanoquinodimethane (TCNQ), tetracyanoethylene (TCNE), 2,3,6,7,10,11-hexamethoxytriphenylene (HMTP), poly(5-amino-1,4-dyhydroxy anthraquinone) (PADAQ), phosphazene disulfide polymer ([(NPS$_2$)$_3$]n), lithiated 1,4,5,8-naphthalenetetraol formaldehyde polymer, Hexaazatrinaphtylene (HATN), Hexaazatriphenylene hexacarbonitrile (HAT(CN)$_6$), 5-Benzylidene hydantoin, Isatine lithium salt, Pyromellitic diimide lithium salt, tetrahydroxy-p-benzoquinone derivatives (THQLi$_4$), N,N'-diphenyl-2,3,5,6-tetraketopiperazine (PHP), N,N'-diallyl-2,3,5,6-tetraketopiperazine (AP), N,N'-dipropyl-2,3,5,6-tetraketopiperazine (PRP), a thioether polymer, a quinone compound, 1,4-benzoquinone, 5,7,12,14-pentacenetetrone (PT), 5-amino-2,3-dihydro-1,4- dyhydroxy anthraquinone (ADDAQ), 5-amino-1,4-dyhydroxy anthraquinone (ADAQ), calixquinone, $Li_4C_6O_6$, $Li_2C_6O_6$, $Li_6C_6O_6$, or a combination thereof.

The thioether polymer is selected from Poly[methanetetryl-tetra(thiomethylene)] (PMTTM), Poly(2,4-dithiopentanylene) (PDTP), a polymer containing Poly(ethene-1,1,2,2-tetrathiol) (PETT) as a main-chain thioether polymers, a side-chain thioether polymer having a main-chain consisting of conjugating aromatic moieties, and having a thioether side chain as a pendant, Poly(2-phenyl-1,3-dithiolane) (PPDT), Poly(1,4-di(1,3-dithiolan-2-yl)benzene) (PDDTB), poly(tetrahydrobenzodithiophene) (PTHBDT), poly[1,2,4,5-tetrakis(propylthio)benzene] (PTKPTB, or poly[3,4(ethylenedithio)thiophene] (PEDTT).

In a preferred embodiment, the cathode active material is an organic material containing a phthalocyanine compound selected from copper phthalocyanine, zinc phthalocyanine, tin phthalocyanine, iron phthalocyanine, lead phthalocyanine, nickel phthalocyanine, vanadyl phthalocyanine, fluorochromium phthalocyanine, magnesium phthalocyanine, manganous phthalocyanine, dilithium phthalocyanine, aluminum phthalocyanine chloride, cadmium phthalocyanine, chlorogallium phthalocyanine, cobalt phthalocyanine, silver phthalocyanine, a metal-free phthalocyanine, a chemical derivative thereof, or a combination thereof.

In this lithium metal battery, the cathode active material constitutes an electrode active material loading greater than 30 mg/cm² (preferably greater than 40 mg/cm², more preferably greater than 45 mg/cm², and most preferably greater than 50 mg/cm²) and/or wherein the first conductive foam structure has a thickness no less than 300 µm (preferably no less than 400 µm, more preferably no less than 500 µm, and can be greater than 600 µm).

DESCRIPTION OF THE PREFERRED EMBODIMENTS

This invention is directed at a method of producing a lithium battery or sodium battery exhibiting an exceptionally high volumetric energy density that has never been previously achieved. This battery can be a primary battery, but is preferably a secondary battery selected from a lithium-ion battery, a lithium metal secondary battery (e.g. using lithium metal as an anode active material), a sodium-ion battery, a sodium metal battery, a lithium-ion capacitor, or a sodium-ion capacitor. The battery is based on an aqueous electrolyte, a non-aqueous or organic electrolyte, an ionic liquid electrolyte, or a mixture of organic and ionic liquid. Preferably the electrolyte is a "quasi-solid electrolyte" containing a high concentration of lithium salt or sodium salt in a liquid solvent to the extent that it behaves like a solid, but remains deformable even when desirable amounts of conductive filaments and an active material are added into the electrolyte (hence, the term "deformable quasi-solid electrode material"). The shape of a lithium battery can be cylindrical, square, button-like, etc. The present invention is not limited to any battery shape or configuration.

For convenience, we will use selected materials, such as lithium iron phosphate (LFP), vanadium oxide ($V_xO_y$), dilithium rhodizonate ($Li_2C_6O_6$), and copper phthalocyanine (CuPc) as illustrative examples of the cathode active material, and graphite, hard carbon, SnO, $Co_3O_4$, and Si particles as examples of the anode active material. These should not be construed as limiting the scope of the invention.

Figure 1A:
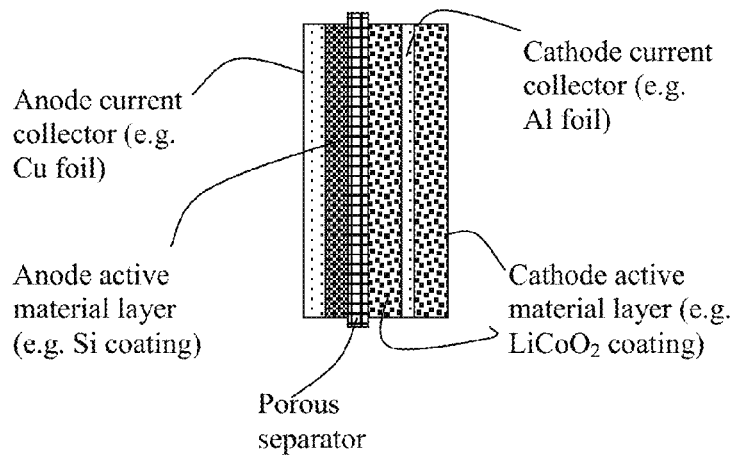
FIG. 1(A) Schematic of a prior art lithium-ion battery cell composed of an anode current collector, one or two anode active material layers (e.g. thin Si coating layers) coated on the two primary surfaces of the anode current collector, a porous separator and electrolyte, one or two cathode electrode layers (e.g. sulfur layers), and a cathode current collector.

As illustrated in FIG. 1(A), a prior art lithium battery cell is typically composed of an anode current collector (e.g. Cu foil), an anode electrode or anode active material layer (e.g. Li metal foil or prelithiated Si coating deposited on one or two sides of a Cu foil), a porous separator and/or an electrolyte component, a cathode electrode or cathode active material layer (or two cathode active material layers coated on two sides of an Al foil), and a cathode current collector (e.g. Al foil).

Figure 1B:
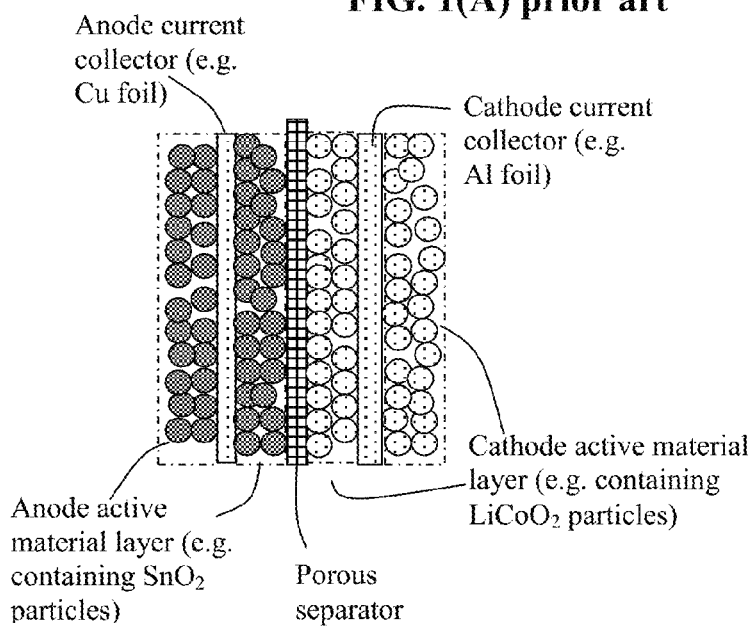
FIG. 1(B) Schematic of a prior art lithium-ion battery, wherein the electrode layer is composed of discrete particles of an active material (e.g. graphite or tin oxide particles in the anode layer or $LiCoO_2$ in the cathode layer), conductive additives (not shown), and resin binder (bot shown).

In a more commonly used prior art cell configuration (FIG. 1(B)), the anode layer is composed of particles of an anode active material (e.g. graphite, hard carbon, or Si), a conductive additive (e.g. carbon black particles), and a resin binder (e.g. SBR or PVDF). The cathode layer is composed of particles of a cathode active material (e.g. LFP particles), a conductive additive (e.g. carbon black particles), and a resin binder (e.g. PVDF). Both the anode and the cathode layers are typically up to 100-200 μm thick to give rise to a presumably sufficient amount of current per unit electrode area. This thickness range is considered an industry-accepted constraint under which a battery designer normally works under. This thickness constraint is due to several reasons: (a) the existing battery electrode coating machines are not equipped to coat excessively thin or excessively thick electrode layers; (b) a thinner layer is preferred based on the consideration of reduced lithium ion diffusion path lengths; but, too thin a layer (e.g. <100 μm) does not contain a sufficient amount of an active lithium storage material (hence, insufficient current output); (c) thicker electrodes are prone to delaminate or crack upon drying or handling after roll-coating; and (d) all non-active material layers in a battery cell (e.g. current collectors and separator) must be kept to a minimum in order to obtain a minimum overhead weight and a maximum lithium storage capability and, hence, a maximized energy density (Wk/kg or Wh/L of cell).

In a less commonly used cell configuration, as illustrated in FIG. 1(A), either the anode active material (e.g. Si coating) or the cathode active material (e.g. lithium transition metal oxide) is deposited in a thin film form directly onto a current collector, such as a sheet of copper foil or Al foil. However, such a thin film structure with an extremely small thickness-direction dimension (typically much smaller than 500 nm, often necessarily thinner than 100 nm) implies that only a small amount of active material can be incorporated in an electrode (given the same electrode or current collector surface area), providing a low total lithium storage capacity and low lithium storage capacity per unit electrode surface area. Such a thin film must have a thickness less than 100 nm to be more resistant to cycling-induced cracking (for the anode) or to facilitate a full utilization of the cathode active material. Such a constraint further diminishes the total lithium storage capacity and the lithium storage capacity per unit electrode surface area. Such a thin-film battery has very limited scope of application.

On the anode side, a Si layer thicker than 100 nm has been found to exhibit poor cracking resistance during battery charge/discharge cycles. It takes but a few cycles for the Si layer to get fragmented. On the cathode side, a sputtered layer of lithium metal oxide thicker than 100 nm does not allow lithium ions to fully penetrate and reach full body of the cathode layer, resulting in a poor cathode active material utilization rate. A desirable electrode thickness is at least 100 μm, with individual active material coating or particle having a dimension desirably less than 100 nm. Thus, these thin-film electrodes (with a thickness <100 nm) directly deposited on a current collector fall short of the required thickness by three (3) orders of magnitude. As a further problem, all of the cathode active materials are not conductive to both electrons and lithium ions. A large layer thickness implies an excessively high internal resistance and a poor active material utilization rate. Sodium batteries have similar issues.

In other words, there are several conflicting factors that must be considered concurrently when it comes to the design and selection of a cathode or anode active material in terms of material type, size, electrode layer thickness, and active material mass loading. Thus far, there has been no effective solution offered by any prior art teaching to these often conflicting problems. We have solved these challenging issues, which have troubled battery designers and electrochemists alike for more than 30 years, by developing a new method of producing lithium batteries or sodium batteries as herein disclosed.

The prior art lithium battery cell is typically made by a process that includes the following steps: (a) The first step is mixing particles of the anode active material (e.g. Si nano particles or meso-carbon micro-beads, MCMBs), a conductive filler (e.g. graphite flakes), a resin binder (e.g. PVDF) in a solvent (e.g. NMP) to form an anode slurry. On a separate basis, particles of the cathode active material (e.g. LFP particles), a conductive filler (e.g. acetylene black), a resin binder (e.g. PVDF) are mixed and dispersed in a solvent (e.g. NMP) to form a cathode slurry. (b) The second step includes coating the anode slurry onto one or both primary surfaces of an anode current collector (e.g. Cu foil), drying the coated layer by vaporizing the solvent (e.g. NMP) to form a dried anode electrode coated on Cu foil. Similarly, the cathode slurry is coated and dried to form a dried cathode electrode coated on Al foil. Slurry coating is normally done in a roll-to-roll manner in a real manufacturing situation; (c) The third step includes laminating an anode/Cu foil sheet, a porous separator layer, and a cathode/Al foil sheet together to form a 3-layer or 5-layer assembly, which is cut and slit into desired sizes and stacked to form a rectangular structure (as an example of shape) or rolled into a cylindrical cell structure. (d) The rectangular or cylindrical laminated structure is then encased in an aluminum-plastic laminated envelope or steel casing. (e) A liquid electrolyte is then injected into the laminated structure to make a lithium battery cell.

There are several serious problems associated with the process and the resulting lithium battery cell:

1) It is very difficult to produce an electrode layer (anode layer or cathode layer) that is thicker than 200 µm. There are several reasons why this is the case. An electrode of 100-200 µm thickness typically requires a heating zone of 30-50 meters long in a slurry coating facility, which is too time consuming, too energy intensive, and not cost-effective. For some electrode active materials, such as metal oxide particles, it has not been possible to produce an electrode of good structural integrity that is thicker than 100 µm in a real manufacturing environment on a continuous basis. The resulting electrodes are very fragile and brittle. Thicker electrodes have a high tendency to delaminate and crack.

2) With a conventional process, as depicted in FIG. 1(A), the actual mass loadings of the electrodes and the apparent densities for the active materials are too low to achieve a gravimetric energy density of >200 Wh/kg. In most cases, the anode active material mass loading of the electrodes (areal density) is significantly lower than 25 mg/cm$^2$ and the apparent volume density or tap density of the active material is typically less than 1.2 g/cm$^3$ even for relatively large particles of graphite. The cathode active material mass loading of the electrodes (areal density) is significantly lower than 45 mg/cm$^2$ for lithium metal oxide-type inorganic materials and lower than 15 mg/cm$^2$ for organic or polymer materials. In addition, there are so many other non-active materials (e.g. conductive additive and resin binder) that add additional weights and volumes to the electrode without contributing to the cell capacity. These low areal densities and low volume densities result in relatively low gravimetric energy density and low volumetric energy density.

3) The conventional process requires dispersing electrode active materials (anode active material and cathode active material) in a liquid solvent (e.g. NMP) to make a slurry and, upon coating on a current collector surface, the liquid solvent has to be removed to dry the electrode layer. Once the anode and cathode layers, along with a separator layer, are laminated together and packaged in a housing to make a supercapacitor cell, one then injects a liquid electrolyte into the cell. In actuality, one makes the two electrodes wet, then makes the electrodes dry, and finally makes them wet again. Such a wet-dry-wet process does not sound like a good process at all.

4) Current lithium-ion batteries still suffer from a relatively low gravimetric energy density and low volumetric energy density. Commercially available lithium-ion batteries exhibit a gravimetric energy density of approximately 150-220 Wh/kg and a volumetric energy density of 450-600 Wh/L.

In literature, the energy density data reported based on either the active material weight alone or the electrode weight cannot directly translate into the energy densities of a practical battery cell or device. The "overhead weight" or weights of other device components (binder, conductive additive, current collectors, separator, electrolyte, and packaging) must also be taken into account. The convention production process results in the weight proportion of the anode active material (e.g. graphite or carbon) in a lithium-ion battery being typically from 12% to 17%, and that of the cathode active material (e.g. LiMn$_2$O$_4$) from 20% to 35%.

The present invention provides a method of producing a lithium battery or sodium battery cell having a high electrode thickness, high active material mass loading, low overhead weight and volume, high capacity, and high energy density.

In certain embodiments, the method comprises:

(a) combining a quantity of an active material (an anode active material or a cathode active material), a quantity of an electrolyte, and a conductive additive to form a deformable and electrically conductive electrode material, wherein the conductive additive, containing conductive filaments, forms a 3D network of electron-conducting pathways; (These conductive filaments, such as carbon nanotubes and graphene sheets, are a mass of randomly aggregated filaments prior to being mixed with particles of an active material and an electrolyte. The mixing procedure involves dispersing these conductive filaments in a highly viscous electrolyte containing particles of an active material. This will be further discussed in later sections.)

(b) forming the electrode material into a quasi-solid electrode, wherein the forming step includes deforming the electrode material into an electrode shape without interrupting the 3D network of electron-conducting pathways such that the electrode maintains an electrical conductivity no less than $10^{-6}$ S/cm (preferably no less than $10^{-5}$ S/cm, more preferably no less than $10^{-4}$ S/cm, further preferably no less than $10^{-3}$ S/cm, still more preferably and typically no less than $10^{-2}$ S/cm, even more typically and preferably no less than $10^{-1}$ S/cm, and further more typically and preferably no less than 1 S/cm; up to 300 S/cm was observed);

(c) forming a second electrode (the second electrode may be a quasi-solid electrode or a conventional electrode); and (d) forming an alkali metal cell by combining the quasi-solid electrode and the second electrode having an ion-conducting separator disposed between the two electrodes.

Figure 1C:
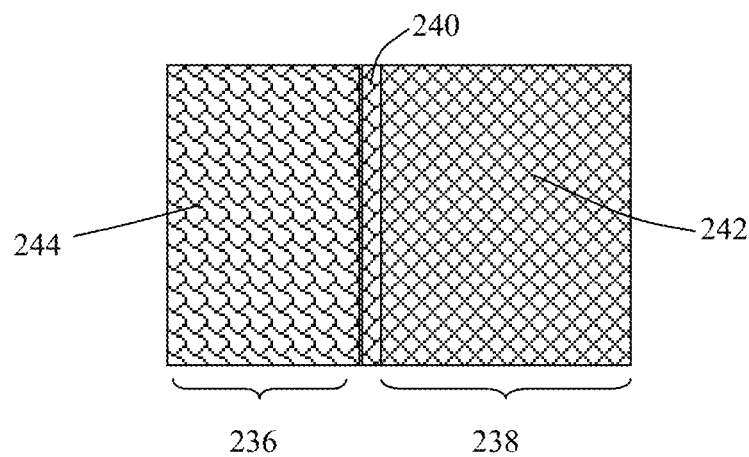
FIG. 1(C) Schematic of a presently invented lithium-ion battery cell, comprising a quasi-solid anode (consisting of anode active material particles and conductive filaments directly mixed or dispersed in an electrolyte), a porous separator, and a quasi-solid cathode (consisting of cathode active material particles and conductive filaments directly mixed or dispersed in an electrolyte). In this embodiment, no resin binder is required.

As illustrated in FIG. 1(C), one preferred embodiment of the present invention is an alkali metal-ion cell having a conductive quasi-solid anode 236, a conductive quasi-solid cathode 238, and a porous separator 240 (or ion-permeable membrane) that electronically separates the anode and the cathode. These three components are typically encased in a protective housing (not shown), which typically has an anode tab (terminal) connected to the anode and a cathode tab (terminal) connected to the cathode. These tabs are for connecting to the external load (e.g. an electronic device to be powered by the battery). In this particular embodiment, the quasi-solid anode 236 contains an anode active material (e.g. particles of Si, not shown in FIG. 1(C)), an electrolyte phase (typically containing a lithium salt or sodium salt dissolved in a solvent; also not shown in FIG. 1(C)), and a conductive additive (containing conductive filaments) that forms a 3D network of electron-conducting pathways 244.

Similarly, the quasi-solid cathode contains a cathode active material, an electrolyte, and a conductive additive (containing conductive filaments) that forms a 3D network of electron-conducting pathways 242.

Figure 1D:
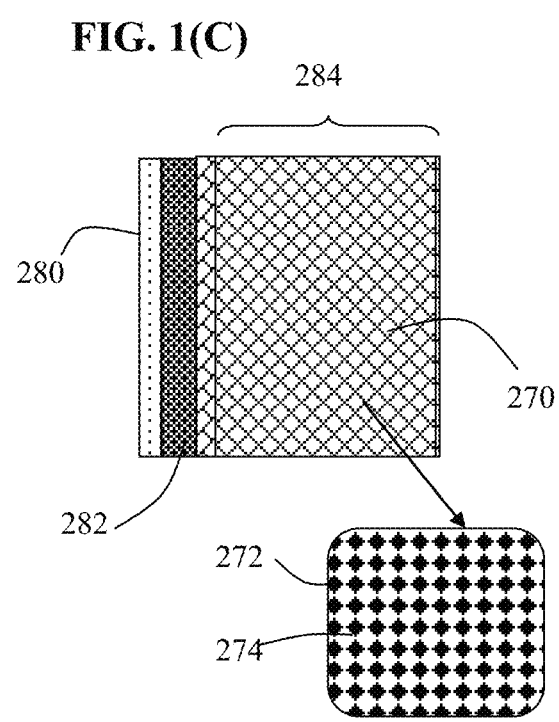
FIG. 1(D) Schematic of a presently invented lithium metal battery cell, comprising an anode (containing a lithium metal layer deposited on a Cu foil surface), a porous separator, and a quasi-solid cathode (consisting of cathode active material particles and conductive filaments directly mixed or dispersed in an electrolyte). In this embodiment, no resin binder is required.
Figure 2A:
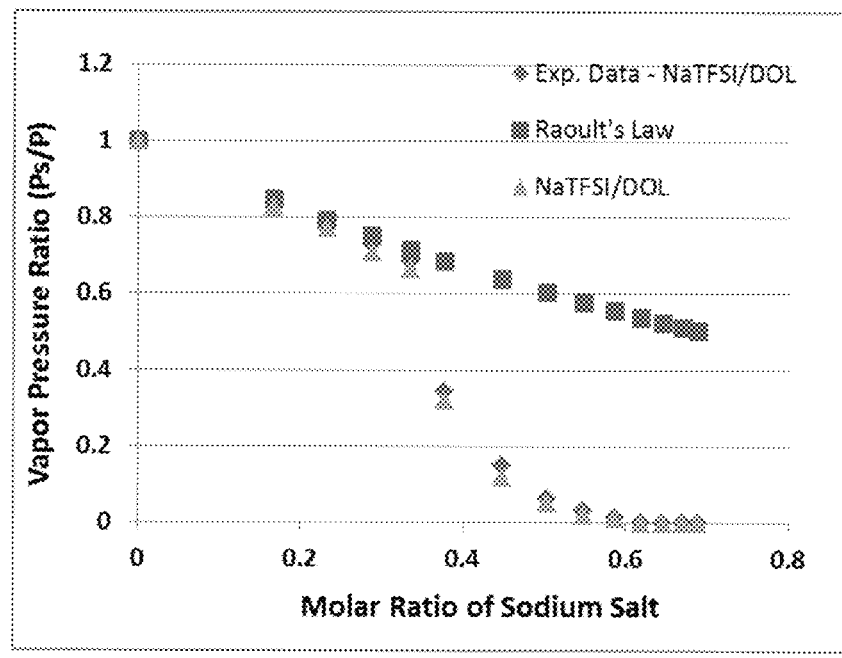
FIG. 2(A) Vapor pressure ratio data ($p_s/p$=vapor pressure of solution/vapor pressure of solvent alone) as a function of the sodium salt molecular ratio x (NaTFSI/DOL), along with the theoretical predictions based on the classic Raoult's Law.
Figure 2B:
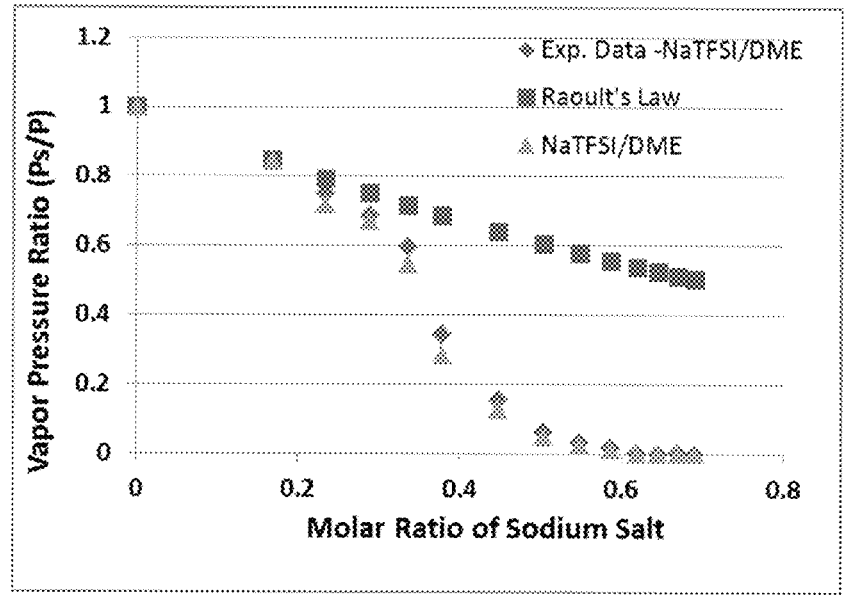
FIG. 2(B) Vapor pressure ratio data ($p_s/p$=vapor pressure of solution/vapor pressure of solvent alone) as a function of the sodium salt molecular ratio x (NaTFSI/DME), along with the theoretical predictions based on classic Raoult's Law.
Figure 2C:
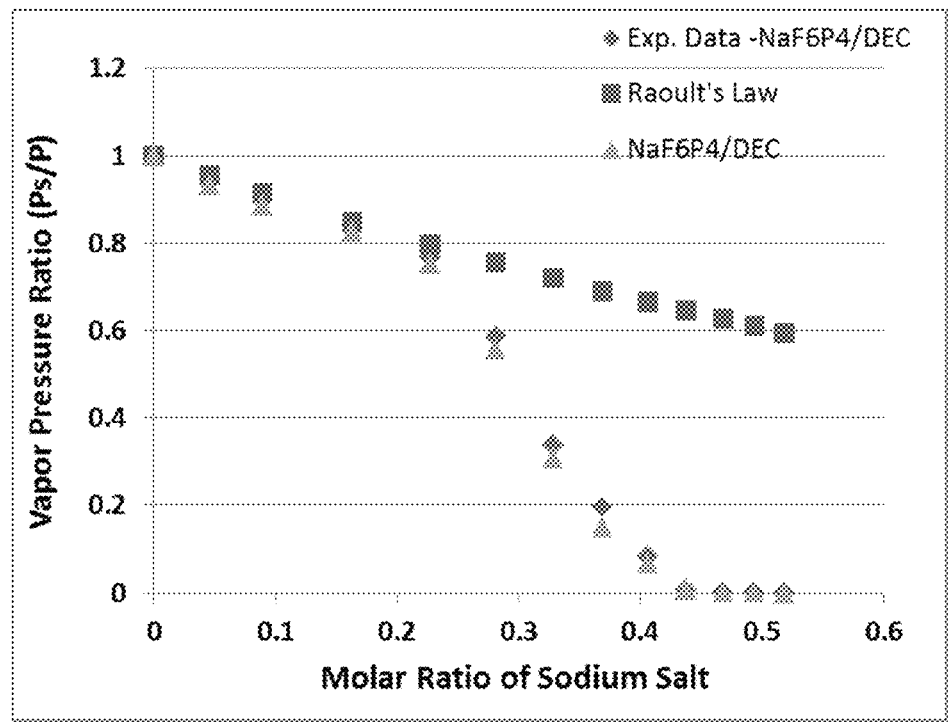
FIG. 2(C) Vapor pressure ratio data ($p_s/p$=vapor pressure of solution/vapor pressure of solvent alone) as a function of the sodium salt molecular ratio x ($NaPF_6$/DOL), along with the theoretical predictions based on classic Raoult's Law.
Figure 2D:
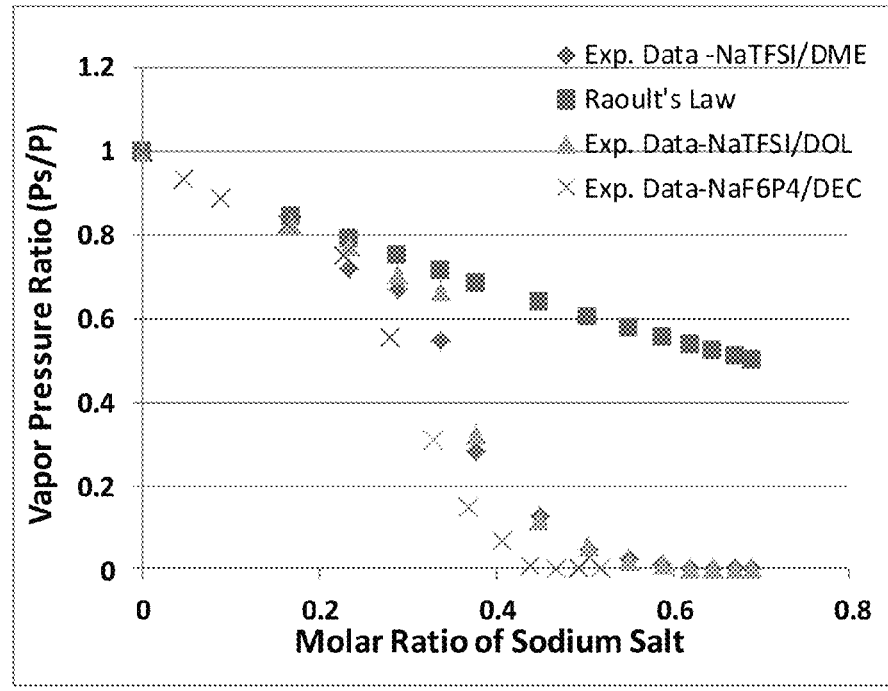
FIG. 2(D) Vapor pressure ratio data ($p_s/p$=vapor pressure of solution/vapor pressure of solvent alone) as a function of the sodium salt molecular ratio x (NaTFSI/DOL, NaTFSI/DME, $NaPF_6$/DOL), along with the theoretical predictions based on classic Raoult's Law.

Another preferred embodiment of the present invention, as illustrated in FIG. 1(D), is an alkali metal cell having an anode composed of a lithium or sodium metal coating/foil 282 deposited/attached to a current collector 280 (e.g. Cu foil), a quasi-solid cathode 284, and a separator or ion-conducting membrane 282. The quasi-solid cathode 284 contains a cathode active material 272 (e.g. particles of $LiCoO_2$), an electrolyte phase 274 (typically containing a lithium salt or sodium salt dissolved in a solvent), and a conductive additive phase (containing conductive filaments) that forms a 3D network 270 of electron-conducting pathways. The present invention also includes a lithium-ion capacitor and a sodium-ion capacitor.

The electrolyte is preferably a quasi-solid electrolyte containing a lithium salt or sodium salt dissolved in a liquid solvent with a salt concentration no less than 2.5 M, preferably greater than 3 M, more preferably greater than 3.5 M, further preferably greater than 5 M, still more preferably greater than 7 M, and even more preferably greater than 10 M. In certain embodiments, the electrolyte is a quasi-solid electrolyte containing a lithium salt or sodium salt dissolved in a liquid solvent with a salt concentration from 3.0 M to 14 M. The choices of lithium salt or sodium salt and the liquid solvent are further discussed in later sections.

Both the quasi-solid anode and the quasi-solid cathode preferably have a thickness greater than 200 μm (preferably greater than 300 μm, more preferably greater than 400 μm, further preferably greater than 500 μm, still more preferably greater than 800 μm, further preferably greater than 1 mm, and can be greater than 5 mm, 1 cm, or thicker. There is no theoretical limitation on the presently invented electrode thickness. In the invented cells, the anode active material typically constitutes an electrode active material loading no less than 20 mg/cm² (more typically and preferably no less than 25 mg/cm² and more preferably no less than 30 mg/cm²) in the anode. The cathode active material constitutes an electrode active material mass loading no less than 45 mg/cm² (typically and preferably greater than 50 mg/cm² and more preferably greater than 60 mg/cm²) for an inorganic material as the cathode active material (no less than 25 mg/cm² for an organic or polymeric cathode active material).

In such configurations (FIG. 1(C) to FIG. 1(D)), the electrons only have to travel a short distance (e.g. a few micrometers) before they are collected by the conductive filaments that constitute the 3D network of electron-conducting pathways and are present everywhere throughout the entire quasi-solid electrode (an anode or cathode). Additionally, all electrode active material particles are pre-dispersed in a liquid electrolyte (no wettability issue), eliminating the existence of dry pockets commonly present in an electrode prepared by the conventional process of wet coating, drying, packing, and electrolyte injection. Thus, the presently invented process or method has a totally unexpected advantage over the conventional battery cell production process.

These conductive filaments (such as carbon nanotubes and graphene sheets), as supplied, are originally a mass of randomly aggregated filaments prior to being mixed with particles of an active material and an electrolyte. The mixing procedure involves dispersing these conductive filaments in a highly viscous electrolyte containing particles of an active material. This is not a trivial task as one might think. The dispersion of nano materials (particularly nano filament materials, such as carbon nanotubes, carbon nanofibers, and graphene sheets) in a highly flowable (non-viscous) liquid has been known to be notoriously difficult, let alone in a highly viscous quasi-solid, such as an electrolyte containing a high loading of an active material (e.g. solid particles, such as Si nano particles for the anode and lithium cobalt oxide for the cathode). This problem is further exacerbated, in some preferred embodiments, by the notion that the electrolyte itself is a quasi-solid electrolyte, containing a high concentration of lithium salt or sodium salt in a solvent.

In some preferred embodiments, the electrolyte contains an alkali metal salt (lithium salt and/or sodium salt) dissolved in an organic or ionic liquid solvent with an alkali metal salt molecular ratio sufficiently high so that the electrolyte exhibits a vapor pressure less than 0.01 kPa or less than 0.6 (60%) of the vapor pressure of the solvent alone (when measured at 20° C.), a flash point at least 20 degrees Celsius higher than a flash point of the first organic liquid solvent alone (when no lithium salt is present), a flash point higher than 150° C., or no detectable flash point at all.

Most surprising and of tremendous scientific and technological significance is our discovery that the flammability of any volatile organic solvent can be effectively suppressed provided that a sufficiently high amount of an alkali metal salt is added to and dissolved in this organic solvent to form a solid-like or quasi-solid electrolyte. In general, such a quasi-solid electrolyte exhibits a vapor pressure less than 0.01 kPa and often less than 0.001 kPa (when measured at 20° C.) and less than 0.1 kPa and often less than 0.01 kPa (when measured at 100° C.). (The vapor pressures of the corresponding neat solvent, without any alkali metal salt dissolved therein, are typically significantly higher.) In many cases, the vapor molecules are practically too few to be detected.

A highly significant observation is that the high solubility of the alkali metal salt in an otherwise highly volatile solvent (a large molecular ratio or molar fraction of alkali metal salt, typically >0.2, more typically >0.3, and often >0.4 or even >0.5) can dramatically curtail the amount of volatile solvent molecules that can escape into the vapor phase in a thermodynamic equilibrium condition. In many cases, this has effectively prevented the flammable solvent gas molecules from initiating a flame even at an extremely high temperature (e.g. using a torch). The flash point of the quasi-solid electrolyte is typically at least 20 degrees (often >50 or >100 degrees) higher than the flash point of the neat organic solvent alone. In most of the cases, either the flash point is higher than 150° C. or no flash point can be detected. The electrolyte just would not catch on fire. Furthermore, any accidentally initiated flame does not sustain for longer than a few seconds. This is a highly significant discovery, considering the notion that fire and explosion concern has been a major impediment to widespread acceptance of battery-powered electric vehicles. This new technology could significantly help accelerate the emergence of a vibrant EV industry.

From the perspective of fundamental chemistry principles, addition of solute molecules to a liquid elevates the boiling temperature of the liquid and reduces its vapor pressure and freezing temperature. These phenomena, as well as osmosis, depend only on the solute concentration and not on its type, and are called colligative properties of solutions. The original Raoult's law provides the relationship between the ratio of the vapor pressure ($p_s$) of a solution to the vapor pressure (p) of the pure liquid and the molar fraction of the solute (x):

$$p_s/p = e^{-x} \qquad \text{Eq. (1a)}$$

For a dilute solution, x<<1 and, hence, $e^{-x} \approx 1-x$. Thus, for the special cases of low solute molar fractions, one obtains a more familiar form of Raoult's law:

$$p_s/p = 1-x \qquad \text{Eq. (1b)}$$

In order to determine if the classic Raoult's law can be used to predict the vapor pressures of highly concentrated electrolytes, we proceeded to investigate a broad array of alkali metal salt/organic solvent combinations. Some of the examples of our research results are summarized in FIG. 2(A) to FIG. 2(D), where the experimental $p_s/p$ values are plotted as a function of the molecular ratio (molar fraction, x) for several salt/solvent combinations. Also plotted for comparison purpose is a curve based on the classic Raoult's law, Eq. (1a). It is clear that, for all types of electrolytes, the $p_s/p$ values follow the Raoult's law prediction until the molar fraction x reaches approximately 0.2, beyond which the vapor pressure rapidly drops to essentially zero (barely detectable). When a vapor pressure is lower than a threshold, no flame would be initiated, and the present invention provides an exceptional platform materials chemistry approach to effectively suppressing the initiation of flame.

Although deviations from Raoult's law are not uncommon in science, this type of curve for the $p_s/p$ values has never been observed for any binary solution systems. In particular, there has been no study reported on the vapor pressure of ultra-high concentration battery electrolytes (with a high molecular fraction, e.g. >0.2 or >0.3, of alkali metal salt) for safety considerations. This is truly unexpected and of utmost technological and scientific significance.

We have further unexpectedly discovered that the presence of a 3D network of electron-conducting pathways, constituted by the conducting nano-filaments, acts to further reduce the threshold concentration of the alkali metal salt required of critical vapor pressure suppression.

Another surprising element of the present invention is the notion that we are able to dissolve a high concentration of an alkali metal salt in just about every type of commonly used battery-grade organic solvent to form a quasi-solid electrolyte suitable for use in a rechargeable alkali metal battery. Expressed in a more easily recognizable term, this concentration is typically greater than 2.5 M (mole/liter), more typically and preferably greater than 3.5 M, still more typically and preferably greater than 5 M, further more preferably greater than 7 M, and most preferably greater than 10 M. With a salt concentration no less than 2.5 M, the electrolyte is no longer a liquid electrolyte; instead, it is a quasi-solid electrolyte. In the art of lithium or sodium battery, such a high concentration of alkali metal salt in a solvent has not been generally considered possible, nor desirable. However, we have found that these quasi-solid electrolytes are surprisingly good electrolytes for both lithium and sodium batteries in terms of significantly improved safety (non-flammability), improved energy density, and improved power density.

In general, the vapor pressure of a solution cannot be predicted directly and straightforwardly from the concentration value in terms of M (mole/liter). Instead, for an alkali metal salt, the molecular ratio x in Raoult's law is the sum of the molar fractions of positive ions and negative ions, which is proportional to the degree of dissociation of a metal salt in a particular solvent at a given temperature. The mole/liter concentrations do not provide adequate information to enable prediction of vapor pressures.

In general, it has not been possible to achieve such a high concentration of alkali metal salt (e.g., x=0.3-0.7) in an organic solvent used in a battery electrolyte, particularly when the network-forming conducting filaments and/or particles of an active material are present as well. After an extensive and in-depth study, we came to further discover that the apparent solubility of an alkali metal salt in a particular solvent could be significantly increased if (a) a highly volatile co-solvent is used to increase the amount of alkali metal salt dissolved in the solvent mixture first and then (b) this volatile co-solvent is partially or totally removed once the dissolution procedure is completed. Quite unexpectedly, the removal of this co-solvent typically did not lead to precipitation or crystallization of the alkali metal salt out of the solution even though the solution would have been in a highly supersaturated state. This novel and unique approach appears to have produced a material state wherein most of the solvent molecules are captured or held in place by the alkali metal salt ions that are not volatile (actually the lithium/sodium salt being like a solid). Therefore, very few volatile solvent molecules are able to escape into the vapor phase and, hence, very few "flammable" gas molecules are present to help initiate or sustain a flame. This has not been suggested as technically possible or viable in the prior art of Na, K, or Li metal batteries.

Furthermore, a skilled artisan in the field of chemistry or materials science would have anticipated that such a high salt concentration should make the electrolyte behave like a solid with an extremely high viscosity and, hence, this electrolyte should not be amenable to fast diffusion of alkali metal ions therein. Consequently, the artisan would have expected that an alkali metal battery containing such a solid-like electrolyte would not and could not exhibit a high capacity at a high charge-discharge rate or under a high current density condition (i.e. the battery should have a poor rate capability). Contrary to these expectations by a person of ordinary skills or even exceptional skills in the art, all the alkali metal cells containing such a quasi-solid electrolyte deliver high energy density and high power density for a long cycle life. It appears that the quasi-solid electrolytes as herein invented and disclosed are conducive to facile alkali metal ion transport. This surprising observation is likely due to two major factors: one related to the internal structure of the electrolyte and the other related to a high $Na^+$ or $Li^+$ ion transference number (TN), to be further explained in a later section of this specification.

Figure 3A:
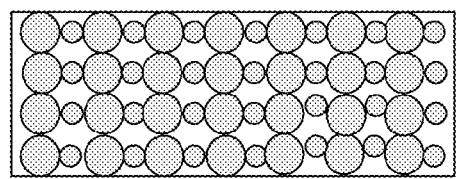
FIG. 3(A) Schematic of the closely packed, highly ordered structure of a solid electrolyte.
Figure 3B:
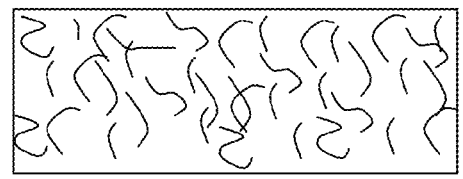
FIG. 3(B) Schematic of a totally amorphous liquid electrolyte having large fractions of free volume through which cations (e.g. $Na^+$) can easily migrate.
Figure 3C:
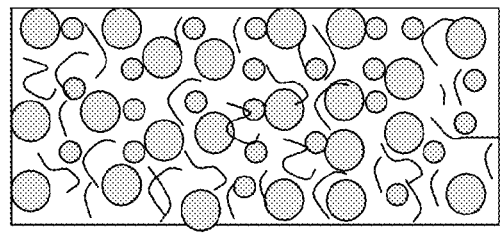
FIG. 3(C) Schematic of the randomized or amorphous structure of a quasi-solid electrolyte having solvent molecules separating salt species to produce amorphous zones for easy migration of free (un-clustered) cations.
Figure 4A:
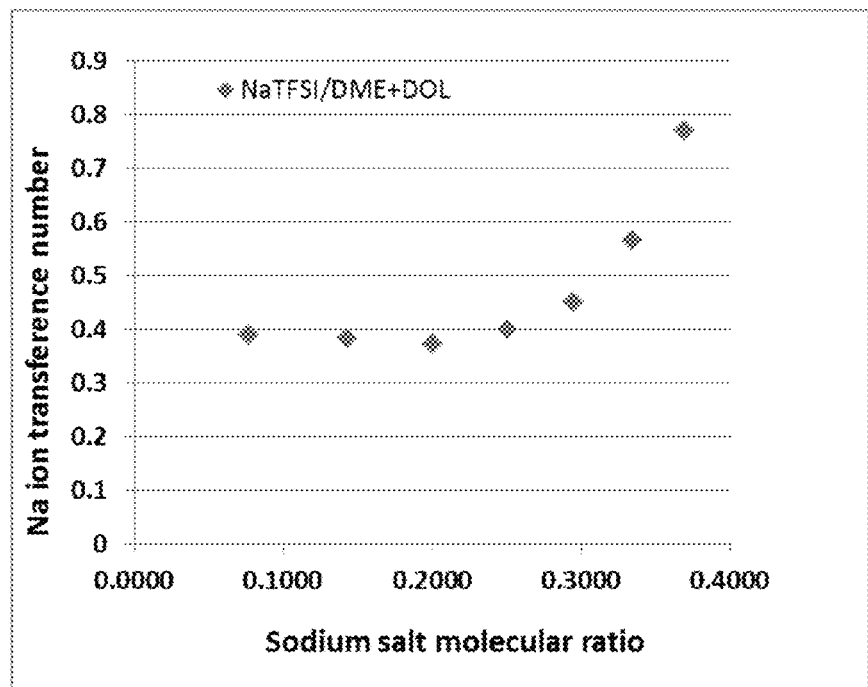
FIG. 4(A) The $Na^+$ ion transference numbers of electrolytes (e.g. NaTFSI salt/(DOL+DME) solvents) in relation to the sodium salt molecular ratio x.
Figure 4B:
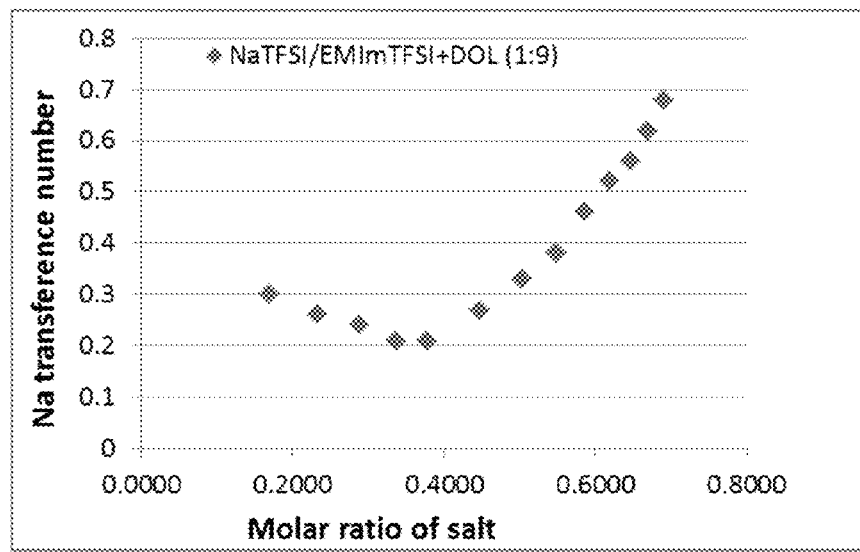
FIG. 4(B) The $Na^+$ ion transference numbers of electrolytes (e.g. NaTFSI salt/(EMImTFSI+DOL) solvents) in relation to the sodium salt molecular ratio x.
Figure 4C:
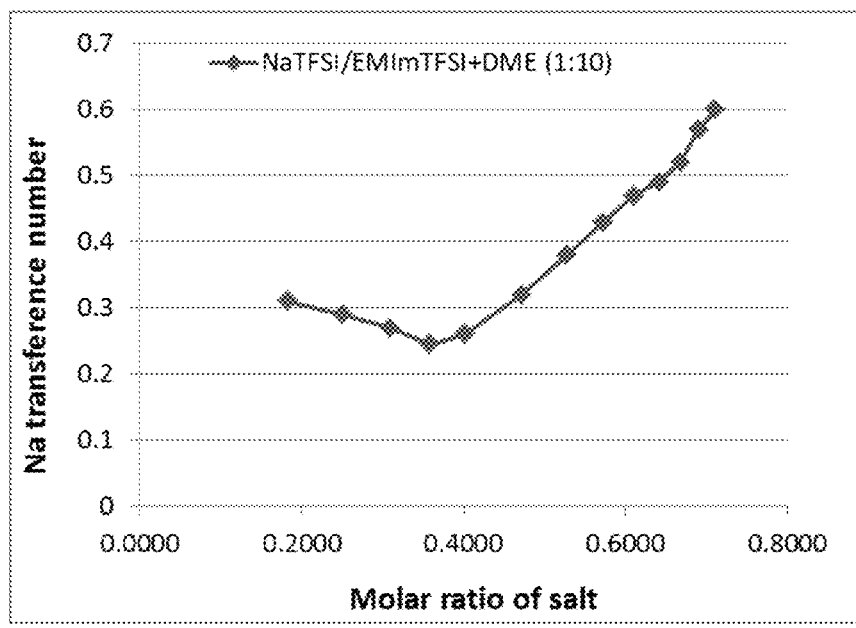
FIG. 4(C) The $Na^+$ ion transference numbers of electrolytes (e.g. NaTFSI salt/(EMImTFSI+DME) solvents) in relation to the sodium salt molecular ratio x.
Figure 4D:
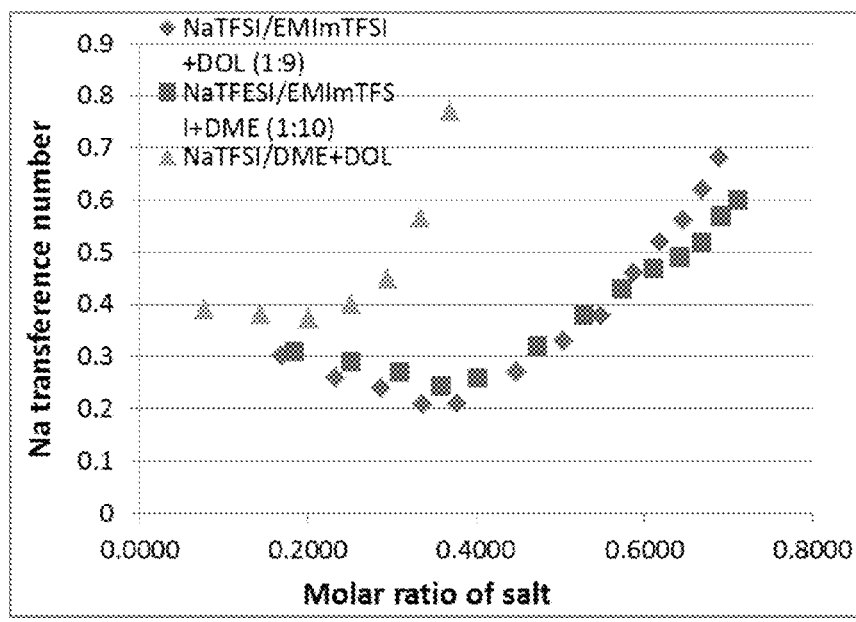
FIG. 4(D) The $Na^+$ ion transference numbers in various electrolytes (as in FIG. 6 to FIG. 8) in relation to the sodium salt molecular ratio x.

Not wishing to be bound by theory, but one can visualize the internal structure of three fundamentally different types of electrolytes by referring to FIG. 3(A) to FIG. 3(C). FIG. 3(A) schematically shows the closely packed, highly ordered structure of a typical solid electrolyte, wherein there is little free volume for diffusion of alkali metal ions. Migration of any ions in such a crystal structure is very difficult, leading to an extremely low diffusion coefficient ($10^{-16}$ to $10^{-12}$ cm$^2$/sec) and extremely low ion conductivity (typically from $10^{-7}$ S/cm to $10^{-4}$ S/cm). In contrast, as schematically shown in FIG. 3($b$), the internal structure of liquid electrolyte is totally amorphous, having large fractions of free volume through which cations (e.g. or $Li^+$ or $Na^+$) can easily migrate, leading to a high diffusion coefficient ($10^{-8}$ to $10^{-6}$ cm$^2$/sec) and high ion conductivity (typically from $10^{-3}$ S/cm to $10^{-2}$ S/cm). However, liquid electrolyte containing a low concentration of alkali metal salt is also flammable and prone to dendrite formation, posing fire and explosion danger. Schematically shown in FIG. 3(C) is the randomized or amorphous structure of a quasi-solid electrolyte having solvent molecules separating salt species to produce amorphous zones for easy migration of free (un-clustered) cations. Such a structure is amenable to achieving a high ion conductivity value (typically $10^{-4}$ S/cm to $8\times10^{-3}$ S/cm), yet still maintaining non-flammability. There are relatively few solvent molecules and these molecules are being retained (prevented from vaporizing) by overwhelmingly large numbers of salt species and the network of conducting filaments.

As a second factor, we have found that the quasi-solid electrolytes provide a TN greater than 0.3 (typically in the range of 0.4-0.8), in contrast to the typical values of 0.1-0.2 in all lower concentration electrolytes (e.g. <2.0 M; 1 M in most cases) used in all current Li-ion and Na-ion cells. As indicated in FIG. 4(A) to FIG. 4(D), the $Na^+$ ion transference number in low salt concentration electrolytes decreases with increasing concentration from x=0 to x=0.2-0.35. However, beyond molecular ratios of x=0.2-0.35, the transference number increases with increasing salt concentration, indicating a fundamental change in the $Na^+$ or $Li^+$ ion transport mechanism. Again, not wishing to be bound by theory, we would like to offer the following scientifically plausible explanations using $Na^+$ ions as an example (similar explanation applies to $Li^+$ ions): When $Na^+$ ions travel in a low salt concentration electrolyte (e.g. x<0.2), each $Na^+$ ion drags one or more solvating molecules along with it. The coordinated migration of such a cluster of charged species can be further impeded if the fluid viscosity is increased (i.e. when more salt is added to the solvent).

Fortunately, when an ultra-high concentration of Na salt (e.g., with x>0.3) is present, $Na^+$ ions could significantly out-number the available solvating species or solvent molecules that otherwise could cluster the lithium ions, forming multi-member complex species and slowing down the diffusion process of $Na^+$ ions. This high $Na^+$ ion concentration makes it possible to have more "free $Na^+$ ions" (those acting alone without being clustered), thereby providing a high $Na^+$ transference number (hence, a facile $Na^+$ transport). In other words, the sodium ion transport mechanism changes from a multi-ion complex-dominating one (with a larger hydrodynamic radius) to single ion-dominating one (with a smaller hydrodynamic radius) having a large number of available free $Na^+$ ions. This observation has further asserted that $Na^+$ ions can operate on quasi-solid electrolytes without compromising the rate capability of a Na metal cell. Yet, these highly concentrated electrolytes are non-flammable and safe. These combined features and advantages for battery applications have never been taught or even slightly hinted in any previous report. Theoretical aspects of ion transference number of quasi-solid electrolytes are now presented below:

In selecting an electrolyte system for a battery, the ionic conductivity of lithium ions or sodium ions is an important factor to consider. The ionic conductivity of $Na^+$ ions in an organic liquid-based electrolyte is on the order of $10^{-3}$-$10^{-2}$ S/cm and that in a solid state electrolyte is typically in the range of $10^{-7}$-$10^{-4}$ S/cm. Due to the low ionic conductivity, solid-state electrolytes have not been used to any significant extent in any battery system. This is a pity since solid-state electrolyte is resistant to dendrite penetration in an alkali metal secondary cell. In contrast, the ionic conductivity of our quasi-solid electrolytes is typically in the range of $10^{-4}$-$8\times10^{-3}$ S/cm, sufficient for use in a rechargeable battery.

The ion mobility or diffusion coefficient is not the only important transport parameter of a battery electrolyte. The individual transference numbers of cations and anions are also important. For instance, when viscous liquids are used as electrolytes in alkali metal batteries, the ion mobility is reduced. Thus, high transference numbers of alkali metal ions in the electrolyte are needed in order to achieve a high ionic conductivity.

The ion transport and diffusion in a liquid electrolyte consisting of only one type of cation (i.e. $Na^+$) and one type of anion, plus a liquid solvent or a mixture of two liquid solvents, may be studied by means of AC impedance spectroscopy and pulsed field gradient NMR techniques. The AC impedance provides information about the overall ionic conductivity, and NMR allows for determination of the individual self-diffusion coefficients of cations and anions. Generally, the self-diffusion coefficients of the cations are slightly higher than those of the anions. It is found that the Haven ratio obtained from the diffusion coefficients and the overall ionic conductivity is typically in the range from 1.3 to 2, indicating that transport of ion pairs or ion complexes (e.g. clusters of $Na^+$-solvating molecules) is an important feature in electrolytes containing a low salt concentration.

The situation becomes more complicated when either two different alkali metal salts or one ionic liquid (as an alkali metal salt or as a liquid solvent) is added to the electrolyte, resulting in a solution having at least 3 or 4 types of ions. In this case, as an example, it is advantageous to use an alkali metal salt containing the same anion as in the solvating ionic liquid, since the amount of dissolvable alkali metal salt is higher than in a mixture with dissimilar anions. Thus, the next logical question to ask is whether it is possible to improve the $Na^+$ (or $Li^+$) transference number by dissolving more sodium (or lithium) salt in liquid solvent.

The relation between the overall ionic conductivity of a three-ion liquid mixture, $\sigma_{dc}$, and the individual diffusion coefficients of the ions, Di, may be given by the Nernst-Einstein equation:

$$\sigma_{dc}=(e^2/k_B TH_R)[(N_{Na^+})(D_{Na^+})+(N_E^+)(D_E^-)+(N_B^-)(D_B^-)] \quad \text{Eq. (2)}$$

Here, e and $k_B$ denote the elementary charge and Boltzmann's constant, respectively, while $N_i$ are the number densities of individual ions ($Na^+$, $Li^+$, $ClO_4^-$, etc.) The Haven ratio, $H_R$, accounts for cross correlations between the movements of different types of ions.

Simple ionic liquids with only one type of cation and anion are characterized by Haven ratios being typically in the range from 1.3 to 2.0. A Haven ratio larger than unity indicates that ions of dissimilar charges move preferentially into the same direction (i.e. ions transport in pairs or clusters). Evidence for such ion pairs can be found using Raman spectra of various electrolytes. The values for the Haven ratios in the three-ion mixtures are in the range from 1.6 to 2.0. The slightly higher $H_R$ values as compared to the electrolytes with x=0 indicate that pair formation is more prominent in the mixtures.

For the same mixtures, the overall ionic conductivity of the mixtures decreases with increasing alkali metal salt content x. This conductivity drop is directly related to a drop of the individual self-diffusion coefficients of all ions. Our studies on different mixtures of ionic liquids with alkali metal salts have shown that the viscosity increases with increasing salt content x. These findings suggest that the addition of alkali metal salt leads to stronger ionic bonds in the liquid mixture, which slow down the liquid dynamics. This is possibly due to the Coulomb interaction between the small sodium (or lithium) ions and the anions being stronger than the Coulomb interactions between the larger organic cations and the anions. Thus, the decrease of the ionic conductivity with increasing alkali metal salt content x is not due to a decreasing number density of mobile ions, but to a decreasing mobility of the ions.

In order to analyze the individual contributions of the cations and anions to the overall ionic conductivity of the mixtures, one may define the apparent transference numbers $t$, by:

$$t_i = N_i Di/(\Sigma N_i Di) \qquad \text{Eq. (3)}$$

As an example, in a mixture of N-butyl-N-methyl-pyrrolidinium bis(trifluoromethanesulfonyl) imide (BMP-TFSI) and sodium bis(trifluoromethanesulfonyl)imide (Na-TFSI), containing $Na^+$, $BMP^+$, and TFSF ions, the apparent lithium transference number $t_{Li}$ increases with increasing Na-TFSI content; at x=0.34, $t_{Na}$=0.242 (vs. $t_{Na}$<0.1 at x<0.2), $D_{Na} \approx 0.7 D_{TFSI}$, and $D_{BMP} \approx 1.6 D_{TFSI}$. The main reason for the higher apparent $Na^+$ transference number in the mixture is the higher number density of $Na^+$ ions.

In order to further enhance the sodium transference number in such mixtures, the number density and/or the diffusion coefficient of the sodium ions have to be further increased relative to the other ions. One would expect a further increase of the $Na^+$ ion number density to be very challenging since the mixtures would tend to undergo salt crystallization or precipitation at high Na salt contents. The present invention has overcome this challenge. We have surprisingly observed that the addition of a very small proportion of a highly volatile organic liquid (e.g. an ether-based solvent) can significantly increase the solubility limit of some Na or Li salt in a highly viscous organic liquid (e.g. VC) or an ionic liquid (e.g. typically from x<0.2 to x>0.3-0.6, or from typically from 1 M to >5 M). This can be achieved with an ionic liquid (or viscous organic liquid)-to-volatile organic solvent ratio as high as 10:1, hence, keeping the volatile solvent content to a bare minimum and minimizing the potential flammability of the electrolyte.

The diffusion coefficients of the ions, as measured in the pulsed field gradient NMR (PFG-NMR) experiments, depend on the effective radius of the diffusing entities. Due to the strong interactions between $Na^+$ ions and $TFSI^-$ ions, $Na^+$ ions can form $[Na(TFSI)_{n+1}]^{n-}$ complexes. Coordination numbers up to n+1=4 for alkali metal ions have been observed. The coordination number determines the effective hydrodynamic radius of the complex and thus the diffusion coefficient in the liquid mixture. The Stokes-Einstein equation, $Di=k_B T/(c\pi \eta r_i)$, may be used to calculate the effective hydrodynamic radius of a diffusing entity, ri, from its diffusion coefficient Di. The constant c varies between 4 and 6, depending on the shape of the diffusing entity. A comparison of the effective hydrodynamic radii of cations and anions in ionic liquids with their van der Waals radii reveals that the c values for cations are generally lower than for anions. In the case of EMI-TFSI/Na-TFSI mixtures, hydrodynamic radii for Na are in the range of 0.9-1.3 nm. This is approximately the van der Waals radius of $[Na(TFSI)_2]^-$ and $[Na(TFSI)_3]^{2-}$ complexes. In the case of the BMP-TFSI/Na-TFSI mixture with x=0.34, the effective hydrodynamic radius of the diffusing sodium complex is $r_{Na}=(D_{BMP}/D_{Na}) r_{BMP} \approx 1.3$ nm, under the assumption that $r_{BMP}$ 0.55 nm and that the c values for $BMP^+$ and for the diffusing Na complex are identical. This value for $r_{Na}$ suggests that the sodium coordination number in the diffusing complex is at least 2 in the mixtures containing a low salt concentration.

Since the number of $TFSI^-$ ions is not high enough to form a significant amount of $[Na(TFSI)_3]^{2-}$ complexes, most sodium ions should be diffusing as $[Na(TFSI)_2]^-$ complexes. If, on the other hand, higher Na salt concentrations are achieved without crystallization (e.g. in our quasi-solid electrolytes), then the mixtures should contain a considerable amount of neutral [Na(TFSI)] complexes, which are smaller ($r_{[Na(TFSI)]} \approx 0.5$ nm) and should have higher diffusivities. Thus, a higher salt concentration would not only enhance the number density of sodium ions but should also lead to higher diffusion coefficients of the diffusing sodium complexes relative to the organic cations. The above analysis is applicable to electrolytes containing either organic liquid solvents or ionic liquid solvents and both lithium ions and sodium ions. In all cases, when the alkali metal salt concentrations are higher than a threshold, there will be an increasing number of free or un-clustered alkali metal ions to move between the anode and the cathode when the concentration is further increased, providing an adequate amount of alkali metal ions required for intercalation/deintercalation or chemical reactions at the cathode and the anode.

In addition to the non-flammability and high alkali metal ion transference numbers as discussed above, there are several additional benefits associated with using the presently invented quasi-solid electrolytes. As one example, the quasi-solid electrolyte can significantly enhance cyclic and safety performance of rechargeable alkali metal batteries through effective suppression of dendrite growth. It is generally accepted that dendrites start to grow in the non-aqueous liquid electrolyte when the anion is depleted in the vicinity of the electrode where plating occurs. In the ultra-high concentration electrolyte, there is a mass of anions to keep the balance of cations ($Li^+$ or $Na^+$) and anions near metallic sodium anode. Further, the space charge created by anion depletion is minimal, which is not conducive to dendrite growth. Furthermore, due to both ultrahigh Na salt concentration and high Na-ion transference number, the quasi-solid electrolyte provides a large amount of available sodium-ion flux and raises the sodium ionic mass transfer rate between the electrolyte and the sodium electrode, thereby enhancing the sodium deposition uniformity and dissolution during charge/discharge processes. Additionally, the local high viscosity induced by a high concentration will increase the pressure from the electrolyte to inhibit dendrite growth, potentially resulting in a more uniform deposition on the surface of the anode. The high viscosity could also limit anion convection near the deposition area, promoting more uniform deposition of sodium ions. Same reasoning is applicable to lithium metal batteries. These reasons, separately or in combination, are believed to be responsible for the notion that no dendrite-like feature has been observed with any of the large number of rechargeable alkali metal cells that we have investigated thus far.

In a preferred embodiment, the anode active material is a prelithiated version of graphene sheets selected from pristine graphene, graphene oxide, reduced graphene oxide, graphene fluoride, graphene chloride, graphene bromide, graphene iodide, hydrogenated graphene, nitrogenated graphene, chemically functionalized graphene, or a combination thereof. The starting graphitic material for producing any one of the above graphene materials may be selected from natural graphite, artificial graphite, meso-phase carbon, meso-phase pitch, meso-carbon micro-bead, soft carbon, hard carbon, coke, carbon fiber, carbon nano-fiber, carbon nanotube, or a combination thereof. Graphene materials are also a good conductive additive for both the anode and cathode active materials of a lithium battery.

The constituent graphene planes of a graphite crystallite in a natural or artificial graphite particle can be exfoliated and extracted or isolated to obtain individual graphene sheets of hexagonal carbon atoms, which are single-atom thick, provided the inter-planar van der Waals forces can be overcome. An isolated, individual graphene plane of carbon atoms is commonly referred to as single-layer graphene. A stack of multiple graphene planes bonded through van der Waals forces in the thickness direction with an inter-graphene plane spacing of approximately 0.3354 nm is commonly referred to as a multi-layer graphene. A multi-layer graphene platelet has up to 300 layers of graphene planes (<100 nm in thickness), but more typically up to 30 graphene planes (<10 nm in thickness), even more typically up to 20 graphene planes (<7 nm in thickness), and most typically up to 10 graphene planes (commonly referred to as few-layer graphene in scientific community). Single-layer graphene and multi-layer graphene sheets are collectively called "nano graphene platelets" (NGPs). Graphene sheets/platelets (collectively, NGPs) are a new class of carbon nano material (a 2-D nano carbon) that is distinct from the 0-D fullerene, the 1-D CNT or CNF, and the 3-D graphite. For the purpose of defining the claims and as is commonly understood in the art, a graphene material (isolated graphene sheets) is not (and does not include) a carbon nanotube (CNT) or a carbon nanofiber (CNF).

Figure 5:
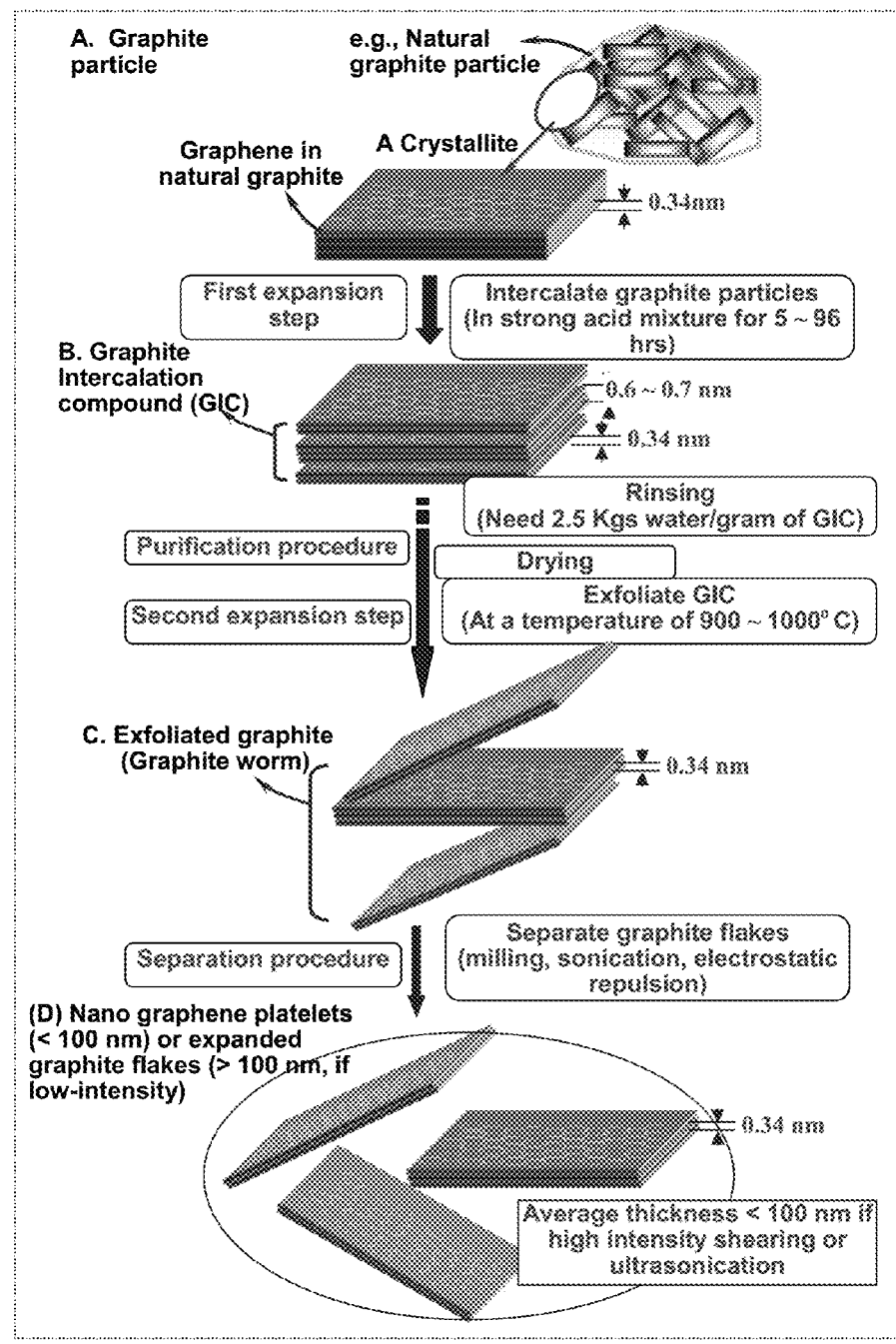
FIG. 5 Schematic of a commonly used process for producing exfoliated graphite, expanded graphite flakes (thickness >100 nm), and graphene sheets (thickness <100 nm, more typically <10 nm, and can be as thin as 0.34 nm).

In one process, graphene materials are obtained by intercalating natural graphite particles with a strong acid and/or an oxidizing agent to obtain a graphite intercalation compound (GIC) or graphite oxide (GO), as illustrated in FIG. 5. The presence of chemical species or functional groups in the interstitial spaces between graphene planes in a GIC or GO serves to increase the inter-graphene spacing ($d_{002}$, as determined by X-ray diffraction), thereby significantly reducing the van der Waals forces that otherwise hold graphene planes together along the c-axis direction. The GIC or GO is most often produced by immersing natural graphite powder in a mixture of sulfuric acid, nitric acid (an oxidizing agent), and another oxidizing agent (e.g. potassium permanganate or sodium perchlorate). The resulting GIC is actually some type of graphite oxide (GO) particles if an oxidizing agent is present during the intercalation procedure. This GIC or GO is then repeatedly washed and rinsed in water to remove excess acids, resulting in a graphite oxide suspension or dispersion, which contains discrete and visually discernible graphite oxide particles dispersed in water. In order to produce graphene materials, one can follow one of the two processing routes after this rinsing step, briefly described below:

Route 1 involves removing water from the suspension to obtain "expandable graphite," which is essentially a mass of dried GIC or dried graphite oxide particles. Upon exposure of expandable graphite to a temperature in the range of typically 800-1,050° C. for approximately 30 seconds to 2 minutes, the GIC undergoes a rapid volume expansion by a factor of 30-300 to form "graphite worms", which are each a collection of exfoliated, but largely un-separated graphite flakes that remain interconnected.

In Route 1A, these graphite worms (exfoliated graphite or "networks of interconnected/non-separated graphite flakes") can be re-compressed to obtain flexible graphite sheets or foils that typically have a thickness in the range of 0.1 mm (100 μm)-0.5 mm (500 μm). Alternatively, one may choose to use a low-intensity air mill or shearing machine to simply break up the graphite worms for the purpose of producing the so-called "expanded graphite flakes" which contain mostly graphite flakes or platelets thicker than 100 nm (hence, not a nano material by definition).

In Route 1B, the exfoliated graphite is subjected to high-intensity mechanical shearing (e.g. using an ultrasonicator, high-shear mixer, high-intensity air jet mill, or high-energy ball mill) to form separated single-layer and multi-layer graphene sheets (collectively called NGPs), as disclosed in our U.S. application Ser. No. 10/858,814 (Jun. 3, 2004). Single-layer graphene can be as thin as 0.34 nm, while multi-layer graphene can have a thickness up to 100 nm, but more typically less than 10 nm (commonly referred to as few-layer graphene). Multiple graphene sheets or platelets may be made into a sheet of NGP paper using a paper-making process. This sheet of NGP paper is an example of the porous graphene structure layer utilized in the presently invented process.

Route 2 entails ultrasonicating the graphite oxide suspension (e.g. graphite oxide particles dispersed in water) for the purpose of separating/isolating individual graphene oxide sheets from graphite oxide particles. This is based on the notion that the inter-graphene plane separation has been increased from 0.3354 nm in natural graphite to 0.6-1.1 nm in highly oxidized graphite oxide, significantly weakening the van der Waals forces that hold neighboring planes together. Ultrasonic power can be sufficient to further separate graphene plane sheets to form fully separated, isolated, or discrete graphene oxide (GO) sheets. These graphene oxide sheets can then be chemically or thermally reduced to obtain "reduced graphene oxides" (RGO) typically having an oxygen content of 0.001%-10% by weight, more typically 0.01%-5% by weight, most typically and preferably less than 2% by weight of oxygen.

For the purpose of defining the claims of the instant application, NGPs or graphene materials include discrete sheets/platelets of single-layer and multi-layer (typically less than 10 layers) pristine graphene, graphene oxide, reduced graphene oxide (RGO), graphene fluoride, graphene chloride, graphene bromide, graphene iodide, hydrogenated graphene, nitrogenated graphene, chemically functionalized graphene, doped graphene (e.g. doped by B or N). Pristine graphene has essentially 0% oxygen. RGO typically has an oxygen content of 0.001%-5% by weight. Graphene oxide (including RGO) can have 0.001%-50% by weight of oxygen. Other than pristine graphene, all the graphene materials have 0.001%-50% by weight of non-carbon elements (e.g. O, H, N, B, F, Cl, Br, I, etc.). These materials are herein referred to as non-pristine graphene materials.

Pristine graphene, in smaller discrete graphene sheets (typically 0.3 μm to 10 μm), may be produced by direct ultrasonication (also known as liquid phase exfoliation or production) or supercritical fluid exfoliation of graphite particles. These processes are well-known in the art.

The graphene oxide (GO) may be obtained by immersing powders or filaments of a starting graphitic material (e.g. natural graphite powder) in an oxidizing liquid medium (e.g. a mixture of sulfuric acid, nitric acid, and potassium permanganate) in a reaction vessel at a desired temperature for a period of time (typically from 0.5 to 96 hours, depending upon the nature of the starting material and the type of oxidizing agent used). As previously described above, the resulting graphite oxide particles may then be subjected to thermal exfoliation or ultrasonic wave-induced exfoliation to produce isolated GO sheets. These GO sheets can then be converted into various graphene materials by substituting —OH groups with other chemical groups (e.g. —Br, $NH_2$, etc.).

Fluorinated graphene or graphene fluoride is herein used as an example of the halogenated graphene material group. There are two different approaches that have been followed to produce fluorinated graphene: (1) fluorination of pre-synthesized graphene: This approach entails treating graphene prepared by mechanical exfoliation or by CVD growth with fluorinating agent such as $XeF_2$, or F-based plasmas; (2) Exfoliation of multilayered graphite fluorides: Both mechanical exfoliation and liquid phase exfoliation of graphite fluoride can be readily accomplished.

Interaction of $F_2$ with graphite at high temperature leads to covalent graphite fluorides $(CF)_n$ or $(C_2F)_n$, while at low temperatures graphite intercalation compounds (GIC) $C_xF$ ($2 \leq x \leq 24$) form. In $(CF)_n$ carbon atoms are sp3-hybridized and thus the fluorocarbon layers are corrugated consisting of trans-linked cyclohexane chairs. In $(C_2F)_n$ only half of the C atoms are fluorinated and every pair of the adjacent carbon sheets are linked together by covalent C—C bonds. Systematic studies on the fluorination reaction showed that the resulting F/C ratio is largely dependent on the fluorination temperature, the partial pressure of the fluorine in the fluorinating gas, and physical characteristics of the graphite precursor, including the degree of graphitization, particle size, and specific surface area. In addition to fluorine ($F_2$), other fluorinating agents may be used, although most of the available literature involves fluorination with $F_2$ gas, sometimes in presence of fluorides.

For exfoliating a layered precursor material to the state of individual layers or few-layers, it is necessary to overcome the attractive forces between adjacent layers and to further stabilize the layers. This may be achieved by either covalent modification of the graphene surface by functional groups or by non-covalent modification using specific solvents, surfactants, polymers, or donor-acceptor aromatic molecules. The process of liquid phase exfoliation includes ultrasonic treatment of a graphite fluoride in a liquid medium.

The nitrogenation of graphene can be conducted by exposing a graphene material, such as graphene oxide, to ammonia at high temperatures (200-400° C.). Nitrogenated graphene could also be formed at lower temperatures by a hydrothermal method; e.g. by sealing GO and ammonia in an autoclave and then increased the temperature to 150-250° C. Other methods to synthesize nitrogen doped graphene include nitrogen plasma treatment on graphene, arc-discharge between graphite electrodes in the presence of ammonia, ammonolysis of graphene oxide under CVD conditions, and hydrothermal treatment of graphene oxide and urea at different temperatures.

There is no restriction on the types of anode active materials or cathode active materials that can be used in practicing the instant invention. Preferably, in the invented lithium cell, the anode active material absorbs lithium ions at an electrochemical potential of less than 1.0 volt (preferably less than 0.7 volts) above the $Li/Li^+$ (i.e. relative to $Li \rightarrow Li^+ + e^-$ as the standard potential) when the battery is charged. In one preferred embodiment, the anode active material of a lithium battery is selected from the group consisting of: (a) Particles of lithium metal or a lithium metal alloy; (b) Natural graphite particles, artificial graphite particles, meso-carbon microbeads (MCMB), carbon particles (including soft carbon and hard carbon), needle coke, carbon nanotubes, carbon nanofibers, carbon fibers, and graphite fibers; (c) Silicon (Si), germanium (Ge), tin (Sn), lead (Pb), antimony (Sb), bismuth (Bi), zinc (Zn), aluminum (Al), nickel (Ni), cobalt (Co), manganese (Mn), titanium (Ti), iron (Fe), and cadmium (Cd); (d) Alloys or intermetallic compounds of Si, Ge, Sn, Pb, Sb, Bi, Zn, Al, or Cd with other elements, wherein said alloys or compounds are stoichiometric or non-stoichiometric; (e) Oxides, carbides, nitrides, sulfides, phosphides, selenides, and tellurides of Si, Ge, Sn, Pb, Sb, Bi, Zn, Al, Fe, Ni, Co, Ti, Mn, or Cd, and their mixtures or composites; (f) Pre-lithiated versions thereof; (g) Pre-lithiated graphene sheets; and combinations thereof.

In certain embodiments, the alkali metal cell is a sodium metal cell or sodium-ion cell and the active material is an anode active material containing a sodium intercalation compound selected from petroleum coke, carbon black, amorphous carbon, activated carbon, hard carbon (carbon that is difficult to graphitize), soft carbon (carbon that can be readily graphitized), templated carbon, hollow carbon nanowires, hollow carbon sphere, titanates, $NaTi_2(PO_4)_3$, $Na_2Ti_3O_7$, $Na_2C_8H_4O_4$, $Na_2TP$, $Na_xTiO_2$ (x=0.2 to 1.0), $Na_2C_8H_4O_4$, carboxylate based materials, $C_8H_4Na_2O_4$, $C_8H_6O_4$, $C_8H_5NaO_4$, $C_8Na_2F_4O_4$, $C_{10}H_2Na_4O_8$, $C_{14}H_4O_6$, $C_{14}H_4Na_4O_8$, or a combination thereof.

In certain embodiments, the alkali metal cell is a sodium metal cell or sodium-ion cell and the active material is an anode active material selected from the group consisting of: (a) Particles of sodium metal or a sodium metal alloy; (b) Natural graphite particles, artificial graphite particles, meso-carbon microbeads (MCMB), carbon particles, needle coke, carbon nanotubes, carbon nanofibers, carbon fibers, and graphite fibers; (c) Sodium-doped silicon (Si), germanium (Ge), tin (Sn), lead (Pb), antimony (Sb), bismuth (Bi), zinc (Zn), aluminum (Al), titanium (Ti), cobalt (Co), nickel (Ni), manganese (Mn), cadmium (Cd), and mixtures thereof; (d) Sodium-containing alloys or intermetallic compounds of Si, Ge, Sn, Pb, Sb, Bi, Zn, Al, Ti, Co, Ni, Mn, Cd, and their mixtures; (e) Sodium-containing oxides, carbides, nitrides, sulfides, phosphides, selenides, tellurides, or antimonides of Si, Ge, Sn, Pb, Sb, Bi, Zn, Al, Fe, Ti, Co, Ni, Mn, Cd, and mixtures or composites thereof; (f) Sodium salts; and (g) Graphene sheets pre-loaded with sodium ions; and combinations thereof.

A wide variety of cathode active materials can be used to practice the presently invented lithium cell. The cathode active material typically is a lithium intercalation compound or lithium-absorbing compound that is capable of storing lithium ions when the lithium battery is discharged and releasing lithium ions into the electrolyte when rec-charged. The cathode active material may be selected from an inorganic material, an organic or polymeric material, a metal oxide/phosphate/sulfide (most desired types of inorganic cathode materials), or a combination thereof.

The group of metal oxide, metal phosphate, and metal sulfides consisting of lithium cobalt oxide, lithium nickel oxide, lithium manganese oxide, lithium vanadium oxide, lithium transition metal oxide, lithium-mixed metal oxide, lithium iron phosphate, lithium manganese phosphate, lithium vanadium phosphate, lithium mixed metal phosphates, transition metal sulfides, and combinations thereof. In particular, the lithium vanadium oxide may be selected from the group consisting of $VO_2$, $Li_xVO_2$, $V_2O_5$, $Li_xV_2O_5$, $V_3O_8$, $Li_xV_3O_8$, $Li_xV_3O_7$, $V_4O_9$, $Li_xV_4O_9$, $V_6O_{13}$, $Li_xV_6O_{13}$, their doped versions, their derivatives, and combinations thereof, wherein $0.1<x<5$. Lithium transition metal oxide may be selected from a layered compound $LiMO_2$, spinel compound $LiM_2O_4$, olivine compound $LiMPO_4$, silicate compound $Li_2MSiO_4$, Tavorite compound $LiMPO_4F$, borate compound $LiMBO_3$, or a combination thereof, wherein M is a transition metal or a mixture of multiple transition metals.

Other inorganic materials for use as a cathode active material may be selected from sulfur, sulfur compound, lithium polysulfide, transition metal dichalcogenide, a transition metal trichalcogenide, or a combination thereof. In particular, the inorganic material is selected from $TiS_2$, $TaS_2$, $MoS_2$, $NbSe_3$, $MnO_2$, $CoO_2$, an iron oxide, a vanadium oxide, or a combination thereof. These will be further discussed later.

In particular, the inorganic material may be selected from: (a) bismuth selenide or bismuth telluride, (b) transition metal dichalcogenide or trichalcogenide, (c) sulfide, selenide, or telluride of niobium, zirconium, molybdenum, hafnium, tantalum, tungsten, titanium, cobalt, manganese, iron, nickel, or a transition metal; (d) boron nitride, or (e) a combination thereof.

The organic material or polymeric material may be selected from Poly(anthraquinonyl sulfide) (PAQS), a lithium oxocarbon, 3,4,9,10-perylenetetracarboxylic dianhydride (PTCDA), poly(anthraquinonyl sulfide), pyrene-4,5,9,10-tetraone (PYT), polymer-bound PYT, Quino(triazene), redox-active organic material, Tetracyanoquinodimethane (TCNQ), tetracyanoethylene (TCNE), 2,3,6,7,10,11-hexamethoxytriphenylene (HMTP), poly(5-amino-1,4-dyhydroxy anthraquinone) (PADAQ), phosphazene disulfide polymer ([$(NPS_2)_3$]n), lithiated 1,4,5,8-naphthalenetetraol formaldehyde polymer, Hexaazatrinaphtylene (HATN), Hexaazatriphenylene hexacarbonitrile ($HAT(CN)_6$), 5-Benzylidene hydantoin, Isatine lithium salt, Pyromellitic diimide lithium salt, tetrahydroxy-p-benzoquinone derivatives ($THQLi_4$), N,N'-diphenyl-2,3,5,6-tetraketopiperazine (PHP), N,N'-diallyl-2,3,5,6-tetraketopiperazine (AP), N,N'-dipropyl-2,3,5,6-tetraketopiperazine (PRP), a thioether polymer, a quinone compound, 1,4-benzoquinone, 5,7,12,14-pentacenetetrone (PT), 5-amino-2,3-dihydro-1,4-dyhydroxy anthraquinone (ADDAQ), 5-amino-1,4-dyhydroxy anthraquinone (ADAQ), calixquinone, $Li_4C_6O_6$, $Li_2C_6O_6$, $Li_6C_6O_6$, or a combination thereof.

The thioether polymer is selected from Poly[methanetetryl-tetra(thiomethylene)] (PMTTM), Poly(2,4-dithiopentanylene) (PDTP), a polymer containing Poly(ethene-1,1,2,2-tetrathiol) (PETT) as a main-chain thioether polymers, a side-chain thioether polymer having a main-chain consisting of conjugating aromatic moieties, and having a thioether side chain as a pendant, Poly(2-phenyl-1,3-dithiolane) (PPDT), Poly(1,4-di(1,3-dithiolan-2-yl)benzene) (PDDTB), poly(tetrahydrobenzodithiophene) (PTHBDT), poly[1,2,4,5-tetrakis (propylthio)benzene] (PTKPTB, or poly[3,4(ethylenedithio)thiophene] (PEDTT).

The organic material may be selected from a phthalocyanine compound selected from copper phthalocyanine, zinc phthalocyanine, tin phthalocyanine, iron phthalocyanine, lead phthalocyanine, nickel phthalocyanine, vanadyl phthalocyanine, fluorochromium phthalocyanine, magnesium phthalocyanine, manganous phthalocyanine, dilithium phthalocyanine, aluminum phthalocyanine chloride, cadmium phthalocyanine, chlorogallium phthalocyanine, cobalt phthalocyanine, silver phthalocyanine, a metal-free phthalocyanine, a chemical derivative thereof, or a combination thereof.

The lithium intercalation compound or lithium-absorbing compound may be selected from a metal carbide, metal nitride, metal boride, metal dichalcogenide, or a combination thereof. Preferably, the lithium intercalation compound or lithium-absorbing compound is selected from an oxide, dichalcogenide, trichalcogenide, sulfide, selenide, or telluride of niobium, zirconium, molybdenum, hafnium, tantalum, tungsten, titanium, vanadium, chromium, cobalt, manganese, iron, or nickel in a nanowire, nano-disc, nano-ribbon, or nano platelet form.

We have discovered that a wide variety of two-dimensional (2D) inorganic materials can be used as a cathode active material in the presented invented lithium battery prepared by the invented direct active material-electrolyte injection process. Layered materials represent a diverse source of 2D systems that can exhibit unexpected electronic properties and good affinity to lithium ions. Although graphite is the best known layered material, transition metal dichalcogenides (TMDs), transition metal oxides (TMOs), and a broad array of other compounds, such as BN, $Bi_2Te_3$, and $Bi_2Se_3$, are also potential sources of 2D materials.

Preferably, the lithium intercalation compound or lithium-absorbing compound is selected from nano discs, nano platelets, nano-coating, or nano sheets of an inorganic material selected from: (a) bismuth selenide or bismuth telluride, (b) transition metal dichalcogenide or trichalcogenide, (c) sulfide, selenide, or telluride of niobium, zirconium, molybdenum, hafnium, tantalum, tungsten, titanium, cobalt, manganese, iron, nickel, or a transition metal; (d) boron nitride, or (e) a combination thereof; wherein the discs, platelets, or sheets have a thickness less than 100 nm. The lithium intercalation compound or lithium-absorbing compound may contain nano discs, nano platelets, nano-coating, or nano sheets of a compound selected from: (i) bismuth selenide or bismuth telluride, (ii) transition metal dichalcogenide or trichalcogenide, (iii) sulfide, selenide, or telluride of niobium, zirconium, molybdenum, hafnium, tantalum, tungsten, titanium, cobalt, manganese, iron, nickel, or a transition metal; (iv) boron nitride, or (v) a combination thereof, wherein the discs, platelets, coating, or sheets have a thickness less than 100 nm.

In the rechargeable sodium cell, the cathode active material may contain a sodium intercalation compound selected from $NaFePO_4$ (Sodium iron phosphate), $Na_{0.7}FePO_4$, $Na_{1.5}VOPO_4F_{0.5}$, $Na_3V_2(PO_4)_3$, $Na_3V_2(PO_4)_2F_3$, $Na_2FePO_4F$, $NaFeF_3$, $NaVPO_4F$, $Na_3V_2(PO_4)_2F_3$, $Na_{1.5}VOPO_4F_{0.5}$, $Na_3V_2(PO_4)_3$, $NaV_6O_{15}$, $Na_xVO_2$, $Na_{0.33}V_2O_5$, $Na_xCoO_2$ (Sodium cobalt oxide), $Na_{2/3}[Ni_{1/3}Mn_{2/3}]O_2$, $Na_x(Fe_{1/2}Mn_{1/2})O_2$, $Na_xMnO_2$ (Sodium manganese bronze), $Na_{0.44}MnO_2$, $Na_{0.44}MnO_2/C$, $Na_4Mn_9O_{18}$, $NaFe_2Mn(PO_4)_3$, $Na_2Ti_3O_7$, $Ni_{1/3}Mn_{1/3}Co_{13}O_2$, $Cu_{0.56}Ni_{0.44}HCF$ (Copper and nickel hexacyanoferrate), NiHCF (nickel hexacyanoferrate), $Na_xCoO_2$, $NaCrO_2$, $Na_3Ti_2(PO_4)_3$, $NiCo_2O_4$, $Ni_3S_2/FeS_2$, $Sb_2O_4$, $Na_4Fe(CN)_6/C$, $NaV_{1-x}Cr_xPO_4F$, $Se_yS_z$ (Selenium and Selenium/Sulfur, z/y from 0.01 to 100), Se (without S), Alluaudites, or a combination thereof.

Alternatively, the cathode active material may be selected from a functional material or nano-structured material having an alkali metal ion-capturing functional group or alkali metal ion-storing surface in direct contact with the electrolyte. Preferably, the functional group reversibly reacts with an alkali metal ion, forms a redox pair with an alkali metal ion, or forms a chemical complex with an alkali metal ion. The functional material or nano-structured material may be selected from the group consisting of (a) a nano-structured or porous disordered carbon material selected from a soft carbon, hard carbon, polymeric carbon or carbonized resin, meso-phase carbon, coke, carbonized pitch, carbon black, activated carbon, nano-cellular carbon foam or partially graphitized carbon; (b) a nano graphene platelet selected from a single-layer graphene sheet or multi-layer graphene platelet; (c) a carbon nanotube selected from a single-walled carbon nanotube or multi-walled carbon nanotube; (d) a carbon nanofiber, nanowire, metal oxide nanowire or fiber, conductive polymer nanofiber, or a combination thereof; (e) a carbonyl-containing organic or polymeric molecule; (f) a functional material containing a carbonyl, carboxylic, or amine group; and combinations thereof.

The functional material or nano-structured material may be selected from the group consisting of Poly(2,5-dihydroxy-1,4-benzoquinone-3,6-methylene), $Na_xC_6O_6$ (x=1-3), $Na_2(C_6H_2O_4)$, $Na_2C_8H_4O_4$ (Na terephthalate), $Na_2C_6H_4O_4$ (Li trans-trans-muconate), 3,4,9,10-perylenetetracarboxylicacid-dianhydride (PTCDA) sulfide polymer, PTCDA, 1,4,5,8-naphthalene-tetracarboxylicacid-dianhydride (NTCDA), Benzene-1,2,4,5-tetracarboxylic dianhydride, 1,4,5,8-tetrahydroxy anthraquinon, Tetrahydroxy-p-benzoquinone, and combinations thereof. Desirably, the functional material or nano-structured material has a functional group selected from —COOH, =O, —NH$_2$, —OR, or —COOR, where R is a hydrocarbon radical.

Non-graphene 2D nano materials, single-layer or few-layer (up to 20 layers), can be produced by several methods: mechanical cleavage, laser ablation (e.g. using laser pulses to ablate TMDs down to a single layer), liquid phase exfoliation, and synthesis by thin film techniques, such as PVD (e.g. sputtering), evaporation, vapor phase epitaxy, liquid phase epitaxy, chemical vapor epitaxy, molecular beam epitaxy (MBE), atomic layer epitaxy (ALE), and their plasma-assisted versions.

A wide range of electrolytes can be used for practicing the instant invention. Most preferred are non-aqueous organic and/or ionic liquid electrolytes. The non-aqueous electrolyte to be employed herein may be produced by dissolving an electrolytic salt in a non-aqueous solvent. Any known non-aqueous solvent which has been employed as a solvent for a lithium secondary battery can be employed. A non-aqueous solvent mainly consisting of a mixed solvent comprising ethylene carbonate (EC) and at least one kind of non-aqueous solvent whose melting point is lower than that of aforementioned ethylene carbonate and whose donor number is 18 or less (hereinafter referred to as a second solvent) may be preferably employed. This non-aqueous solvent is advantageous in that it is (a) stable against a negative electrode containing a carbonaceous material well developed in graphite structure; (b) effective in suppressing the reductive or oxidative decomposition of electrolyte; and (c) high in conductivity. A non-aqueous electrolyte solely composed of ethylene carbonate (EC) is advantageous in that it is relatively stable against decomposition through a reduction by a graphitized carbonaceous material. However, the melting point of EC is relatively high, 39 to 40° C., and the viscosity thereof is relatively high, so that the conductivity thereof is low, thus making EC alone unsuited for use as a secondary battery electrolyte to be operated at room temperature or lower. The second solvent to be used in a mixture with EC functions to make the viscosity of the solvent mixture lower than that of EC alone, thereby promoting the ion conductivity of the mixed solvent. Furthermore, when the second solvent having a donor number of 18 or less (the donor number of ethylene carbonate is 16.4) is employed, the aforementioned ethylene carbonate can be easily and selectively solvated with lithium ion, so that the reduction reaction of the second solvent with the carbonaceous material well developed in graphitization is assumed to be suppressed. Further, when the donor number of the second solvent is controlled to not more than 18, the oxidative decomposition potential to the lithium electrode can be easily increased to 4 V or more, so that it is possible to manufacture a lithium secondary battery of high voltage.

Preferable second solvents are dimethyl carbonate (DMC), methylethyl carbonate (MEC), diethyl carbonate (DEC), ethyl propionate, methyl propionate, propylene carbonate (PC), .gamma.-butyrolactone (.gamma.-BL), acetonitrile (AN), ethyl acetate (EA), propyl formate (PF), methyl formate (MF), toluene, xylene and methyl acetate (MA). These second solvents may be employed singly or in a combination of two or more. More desirably, this second solvent should be selected from those having a donor number of 16.5 or less. The viscosity of this second solvent should preferably be 28 cps or less at 25° C.

The mixing ratio of the aforementioned ethylene carbonate in the mixed solvent should preferably be 10 to 80% by volume. If the mixing ratio of the ethylene carbonate falls outside this range, the conductivity of the solvent may be lowered or the solvent tends to be more easily decomposed, thereby deteriorating the charge/discharge efficiency. More preferable mixing ratio of the ethylene carbonate is 20 to 75% by volume. When the mixing ratio of ethylene carbonate in a non-aqueous solvent is increased to 20% by volume or more, the solvating effect of ethylene carbonate to lithium ions will be facilitated and the solvent decomposition-inhibiting effect thereof can be improved.

Examples of preferred mixed solvent are a composition comprising EC and MEC; comprising EC, PC and MEC; comprising EC, MEC and DEC; comprising EC, MEC and DMC; and comprising EC, MEC, PC and DEC; with the volume ratio of MEC being controlled within the range of 30 to 80%. By selecting the volume ratio of MEC from the range of 30 to 80%, more preferably 40 to 70%, the conductivity of the solvent can be improved. With the purpose of suppressing the decomposition reaction of the solvent, an electrolyte having carbon dioxide dissolved therein may be employed, thereby effectively improving both the capacity and cycle life of the battery. The electrolytic salts to be incorporated into a non-aqueous electrolyte may be selected from a lithium salt such as lithium perchlorate (LiClO$_4$), lithium hexafluorophosphate (LiPF$_6$), lithium borofluoride (LiBF$_4$), lithium hexafluoroarsenide (LiAsF$_6$), lithium trifluoro-metasulfonate (LiCF$_3$SO$_3$) and bis-trifluoromethyl sulfonylimide lithium [LiN(CF$_3$SO$_2$)$_2$]. Among them, LiPF$_6$, LiBF$_4$ and LiN(CF$_3$SO$_2$)$_2$ are preferred. The content of aforementioned electrolytic salts in the non-aqueous solvent is preferably 0.5 to 2.0 mol/l.

For sodium cells, the electrolyte (including non-flammable quasi-solid electrolyte) may contain a sodium salt preferably selected from sodium perchlorate (NaClO$_4$), sodium hexafluorophosphate (NaPF$_6$), sodium borofluoride (NaBF$_4$), sodium hexafluoroarsenide, sodium trifluoro-metasulfonate (NaCF$_3$SO$_3$), bis-trifluoromethyl sulfonylimide sodium (NaN(CF$_3$SO$_2$)$_2$), an ionic liquid salt, or a combination thereof.

The ionic liquid is composed of ions only. Ionic liquids are low melting temperature salts that are in a molten or liquid state when above a desired temperature. For instance, a salt is considered as an ionic liquid if its melting point is below 100° C. If the melting temperature is equal to or lower than room temperature (25° C.), the salt is referred to as a room temperature ionic liquid (RTIL). The IL salts are characterized by weak interactions, due to the combination of a large cation and a charge-delocalized anion. This results in a low tendency to crystallize due to flexibility (anion) and asymmetry (cation).

A typical and well-known ionic liquid is formed by the combination of a 1-ethyl-3-methylimidazolium (EMI) cation and an N,N-bis(trifluoromethane)sulphonamide (TFSI) anion. This combination gives a fluid with an ionic conductivity comparable to many organic electrolyte solutions and a low decomposition propensity and low vapor pressure up to −300-400° C. This implies a generally low volatility and non-flammability and, hence, a much safer electrolyte for batteries.

Ionic liquids are basically composed of organic ions that come in an essentially unlimited number of structural variations owing to the preparation ease of a large variety of their components. Thus, various kinds of salts can be used to design the ionic liquid that has the desired properties for a given application. These include, among others, imidazolium, pyrrolidinium and quaternary ammonium salts as cations and bis(trifluoromethanesulphonyl) imide, bis(fluorosulphonyl)imide, and hexafluorophosphate as anions. Based on their compositions, ionic liquids come in different classes that basically include aprotic, protic and zwitterionic types, each one suitable for a specific application.

Common cations of room temperature ionic liquids (RTILs) include, but not limited to, tetraalkylammonium, di-, tri-, and tetra-alkylimidazolium, alkylpyridinium, dialkyl-pyrrolidinium, dialkylpiperidinium, tetraalkylphosphonium, and trialkylsulfonium. Common anions of RTILs include, but not limited to, $BF_4^-$, $B(CN)_4^-$, $CH_3BF_3^-$, $CH2CHBF_3^-$, $CF_3BF_3^-$, $C_2F_5BF_3^-$, $n\text{-}C_3F_7BF_3^-$, $n\text{-}C_4F_9BF_3^-$, $PF_6^-$, $CF_3CO_2^-$, $CF_3SO_3^-$, $N(SO_2CF_3)_2^-$, $N(COCF_3)(SO_2CF_3)^-$, $N(SO_2F)_2^-$, $N(CN)_2^-$, $C(CN)_3^-$, $SCN^-$, $SeCN^-$, $CuCl_2^-$, $AlCl_4^-$, $F(HF)_{23}^-$, etc. Relatively speaking, the combination of imidazolium- or sulfonium-based cations and complex halide anions such as $AlCl_4^-$, $BF_4^-$, $CF_3CO_2^-$, $CF_3SO_3^-$, $NTf_2^-$, $N(SO_2F)_2^-$, or $F(HF)_{23}^-$ results in RTILs with good working conductivities.

RTILs can possess archetypical properties such as high intrinsic ionic conductivity, high thermal stability, low volatility, low (practically zero) vapor pressure, non-flammability, the ability to remain liquid at a wide range of temperatures above and below room temperature, high polarity, high viscosity, and wide electrochemical windows. These properties, except for the high viscosity, are desirable attributes when it comes to using an RTIL as an electrolyte ingredient (a salt and/or a solvent) in a supercapacitor.

In what follows, we provide some examples of several different types of anode active materials, cathode active materials, and porous current collector materials (e.g. graphite foam, graphene foam, and metal foam) to illustrate the best mode of practicing the instant invention. Theses illustrative examples and other portions of instant specification and drawings, separately or in combinations, are more than adequate to enable a person of ordinary skill in the art to practice the instant invention. However, these examples should not be construed as limiting the scope of instant invention.

Example 1: Preparation of Graphene Oxide (GO) and Reduced Graphene Oxide (RGO) Nano Sheets from Natural Graphite Powder Natural graphite from Huadong Graphite Co. (Qingdao, China) was used as the starting material. GO was obtained by following the well-known modified Hummers method, which involved two oxidation stages. In a typical procedure, the first oxidation was achieved in the following conditions: 1100 mg of graphite was placed in a 1000 mL boiling flask. Then, 20 g of $K_2S_2O_8$, 20 g of $P_2O_5$, and 400 mL of a concentrated aqueous solution of $H_2SO_4$ (96%) were added in the flask. The mixture was heated under reflux for 6 hours and then let without disturbing for 20 hours at room temperature. Oxidized graphite was filtered and rinsed with abundant distilled water until neutral pH. A wet cake-like material was recovered at the end of this first oxidation.

For the second oxidation process, the previously collected wet cake was placed in a boiling flask that contains 69 mL of a concentrated aqueous solution of $H_2SO_4$ (96%). The flask was kept in an ice bath as 9 g of $KMnO_4$ was slowly added. Care was taken to avoid overheating. The resulting mixture was stirred at 35° C. for 2 hours (the sample color turning dark green), followed by the addition of 140 mL of water. After 15 min, the reaction was halted by adding 420 mL of water and 15 mL of an aqueous solution of 30 wt % $H_2O_2$. The color of the sample at this stage turned bright yellow. To remove the metallic ions, the mixture was filtered and rinsed with a 1:10 HCl aqueous solution. The collected material was gently centrifuged at 2700 g and rinsed with deionized water. The final product was a wet cake that contained 1.4 wt % of GO, as estimated from dry extracts. Subsequently, liquid dispersions of GO platelets were obtained by lightly sonicating wet-cake materials, which were diluted in deionized water.

Surfactant-stabilized RGO (RGO-BS) was obtained by diluting the wet-cake in an aqueous solution of surfactants instead of pure water. A commercially available mixture of cholate sodium (50 wt. %) and deoxycholate sodium (50 wt. %) salts provided by Sigma Aldrich was used. The surfactant weight fraction was 0.5 wt. %. This fraction was kept constant for all samples. Sonication was performed using a Branson Sonifier S-250A equipped with a 13 mm step disruptor horn and a 3 mm tapered micro-tip, operating at a 20 kHz frequency. For instance, 10 mL of aqueous solutions containing 0.1 wt. % of GO was sonicated for 10 min and subsequently centrifuged at 2700 g for 30 min to remove any non-dissolved large particles, aggregates, and impurities. Chemical reduction of as-obtained GO to yield RGO was conducted by following the method, which involved placing 10 mL of a 0.1 wt. % GO aqueous solution in a boiling flask of 50 mL. Then, 10 µL of a 35 wt. % aqueous solution of $N_2H_4$ (hydrazine) and 70 mL of a 28 wt. % of an aqueous solution of $NH_4OH$ (ammonia) were added to the mixture, which was stabilized by surfactants. The solution was heated to 90° C. and refluxed for 1 h. The pH value measured after the reaction was approximately 9. The color of the sample turned dark black during the reduction reaction.

RGO was used as a conductive additive in either or both of the anode and cathode active material in certain lithium batteries presently invented. Pre-lithiated RGO (e.g. RGO+ lithium particles or RGO pre-deposited with lithium coating) was also used as an anode active material in selected lithium-ion cells.

For comparison purposes, slurry coating and drying procedures were conducted to produce conventional electrodes. One anode and one cathode, and a separator disposed between the two electrodes, were then assembled and encased in an Al-plastic laminated packaging envelop, followed by liquid electrolyte injection to form a prior art lithium battery cell.

Example 2: Preparation of Pristine Graphene Sheets (0% Oxygen)

Recognizing the possibility of the high defect population in GO sheets acting to reduce the conductivity of individual graphene plane, we decided to study if the use of pristine graphene sheets (non-oxidized and oxygen-free, non-halogenated and halogen-free, etc.) can lead to a conductive additive having a high electrical and thermal conductivity. Pre-lithiated pristine graphene was also used as an anode active material. Pristine graphene sheets were produced by using the direct ultrasonication or liquid-phase production process.

In a typical procedure, five grams of graphite flakes, ground to approximately 20 µm or less in sizes, were dispersed in 1,000 mL of deionized water (containing 0.1% by weight of a dispersing agent, Zonyl® FSO from DuPont)

to obtain a suspension. An ultrasonic energy level of 85 W (Branson 5450 Ultrasonicator) was used for exfoliation, separation, and size reduction of graphene sheets for a period of 15 minutes to 2 hours. The resulting graphene sheets are pristine graphene that have never been oxidized and are oxygen-free and relatively defect-free. Pristine graphene is essentially free from any non-carbon elements.

Pristine graphene sheets, as a conductive additive, along with an anode active material (or cathode active material in the cathode) were then incorporated in a battery using both the presently invented procedure of slurry injection into foam pores and conventional procedure of slurry coating, drying and layer laminating. Both lithium-ion batteries and lithium metal batteries (injection into cathode only) were investigated.

Example 3: Preparation of Prelithiated Graphene Fluoride Sheets as an Anode Active Material of a Lithium-Ion Battery Several processes have been used by us to produce GF, but only one process is herein described as an example. In a typical procedure, highly exfoliated graphite (HEG) was prepared from intercalated compound $C_2F \cdot xClF_3$. HEG was further fluorinated by vapors of chlorine trifluoride to yield fluorinated highly exfoliated graphite (FHEG). Pre-cooled Teflon reactor was filled with 20-30 mL of liquid pre-cooled $ClF_3$, the reactor was closed and cooled to liquid nitrogen temperature. Then, no more than 1 g of HEG was put in a container with holes for $ClF_3$ gas to access and situated inside the reactor. In 7-10 days a gray-beige product with approximate formula $C_2F$ was formed.

Subsequently, a small amount of FHEG (approximately 0.5 mg) was mixed with 20-30 mL of an organic solvent (methanol and ethanol, separately) and subjected to an ultrasound treatment (280 W) for 30 min, leading to the formation of homogeneous yellowish dispersions. Upon removal of solvent, the dispersion became a brownish powder. The graphene fluoride powder was mixed with surface-stabilized lithium powder in a liquid electrolyte, allowing for pre-lithiation to occur.

Example 4: Some Examples of Electrolytes Used

Preferred sodium metal salts include: sodium perchlorate ($NaClO_4$), sodium hexafluorophosphate ($NaPF_6$), sodium borofluoride ($NaBF_4$), sodium hexafluoroarsenide, potassium hexafluoroarsenide, sodium trifluoro-metasulfonate ($NaCF_3SO_3$), and bis-trifluoromethyl sulfonylimide sodium ($NaN(CF_3SO_2)_2$). The following are good choices for lithium salts that tend to be dissolved well in selected organic or ionic liquid solvents: lithium borofluoride ($LiBF_4$), lithium trifluoro-metasulfonate ($LiCF_3SO_3$), lithium bis-trifluoromethyl sulfonylimide ($LiN(CF_3SO_2)_2$ or LITFSI), lithium bis(oxalato)borate (LiBOB), lithium oxalyldifluoroborate ($LiBF_2C_2O_4$), and lithium bisperfluoroethy-sulfonylimide (LiBETI). A good electrolyte additive for helping to stabilize Li metal is $LiNO_3$. Particularly useful ionic liquid-based lithium salts include: lithium bis(trifluoro methanesulfonyl)imide (LiTFSI).

Preferred organic liquid solvents include: ethylene carbonate (EC), dimethyl carbonate (DMC), methylethyl carbonate (MEC), diethyl carbonate (DEC), propylene carbonate (PC), acetonitrile (AN), vinylene carbonate (VC), allyl ethyl carbonate (AEC), 1,3-dioxolane (DOL), 1,2-dimethoxyethane (DME), tetraethylene glycol dimethylether (TEGDME), Poly(ethylene glycol) dimethyl ether (PEGDME), diethylene glycol dibutyl ether (DEGDBE), 2-ethoxyethyl ether (EEE), hydrofloroether (e.g. TPTP), sulfone, and sulfolane.

Preferred ionic liquid solvents may be selected from a room temperature ionic liquid (RTIL) having a cation selected from tetraalkylammonium, di-alkylimidazolium, alkylpyridinium, dialkyl-pyrrolidinium, or dialkylpiperidinium. The counter anion is preferably selected from $BF_4^-$, $B(CN)_4^-$, $CF_3CO_2^-$, $CF_3SO_3^-$, $N(SO_2CF_3)_2^-$, $N(COCF_3)(SO_2CF_3)^-$, or $N(SO_2F)_2^-$. Particularly useful ionic liquid-based solvents include N-n-butyl-N-ethylpyrrolidinium bis(trifluoromethane sulfonyl)imide (BEPyTFSI), N-methyl-N-propylpiperidinium bis(trifluoromethyl sulfonyl)imide ($PP_{13}TFSI$), and NA-diethyl-AT-methyl-N-(2-methoxyethyl) ammonium bis(trifluoromethyl sulfonyl)imide.

Example 5: Vapor Pressure of Some Solvents and Corresponding Quasi-Solid Electrolytes with Various Sodium Salt Molecular Ratios Vapor pressures of several solvents (DOL, DME, PC, AN, with or without an ionic liquid-based co-solvent, $PP_{13}TFSI$) before and after adding a wide molecular ratio range of sodium salts, such as sodium borofluoride ($NaBF_4$), sodium perchlorate ($NaClO_4$), or sodium bis(trifluoro methanesulfonyl)imide (NaTFSI), were measured. Some of the vapor pressure ratio data ($p_s/p$=vapor pressure of solution/vapor pressure of solvent alone) are plotted as a function of the lithium salt molecular ratio x, as shown in FIG. 2(A) to FIG. 2(D), along with a curve representing the Raoult's Law. In all cases, the vapor pressure ratio follows the theoretical prediction based on Raoult's Law for up to x<0.15 only, above which the vapor pressure deviates from Raoult's Law in a novel and unprecedented manner. It appears that the vapor pressure drops at a very high rate when the molecular ratio x exceeds 0.2, and rapidly approaches a minimal or essentially zero when x exceeds 0.4. With a very low $p_s/p$ value, the vapor phase of the electrolyte either cannot ignite or cannot sustain a flame for longer than 3 seconds once initiated.

Example 6: Flash Points and Vapor Pressure of Some Solvents and Corresponding Quasi-Solid Electrolytes with a Sodium or Lithium Salt Molecular Ratio of x=0.3

The flash points and vapor pressures of several solvents and their electrolytes with a Na or Li salt molecular ratio x=0.3 are presented in Table 1 below. It may be noted that, according to the OSHA (Occupational Safety & Health Administration) classification, any liquid with a flash point below 38.7° C. is flammable. However, in order to ensure safety, we have designed our quasi-solid electrolytes to exhibit a flash point significantly higher than 38.7° C. (by a large margin, e.g. at least increased by 50° and preferably above 150° C.). The data in Table 1 indicate that the addition of an alkali metal salt to a molecular ratio of 0.35 is normally sufficient to meet these criteria. All our quasi-solid electrolytes are not flammable.

TABLE 1

The flash points and vapor pressures of select solvents and their electrolytes with an alkali salt molecular ratio x = 0.3 (Flash point data for the first 4 liquids are given as points of reference).

| Chemical | Flash point (° C.) | Flash point (° C.) with x = 0.35 of (Li, or Na salt) | Vapor pressure (kPa) at 20° C. | Vapor pressure (kPa) at 20° C. with x = 0.35 |
|---|---|---|---|---|
| Acetone | −17 | — | 24 kPa (240 hPa) | — |
| Ethanol | 17 | — | — | — |
| DOL (1,3-dioxolane) | 1 | 75 (LiBF$_4$) | 9.33 (70 Torr) | 2.6 (LiBF$_4$) |
| DOL | 1 | 155 (LiCF$_3$SO$_3$) 180(NaCF$_3$SO$_3$) | 9.33 | 0.8 (LiCF$_3$SO$_3$) 0.6 (LiCF$_3$SO$_3$) |
| DEC (diethyl carbonate) | 33 | >200 (LiCF$_3$SO$_3$) | 1.33 (10 Torr) | 0.09 (LiCF$_3$SO$_3$) |
| DMC (Dimethyl carbonate) | 18 | 177 (LiCF$_3$SO$_3$) | 2.40 (18 Torr) | 0.13 (LiCF$_3$SO$_3$) |
| EMC (ethyl methyl carbonate) | 23 | 188 (LiBOB) | 3.60 (27 Torr) | 0.1 (LiBOB) |
| EC (ethylene carbonate) | 145 | No flash point (LiBOB) | <0.0013 (0.02 Torr at 36.4° C.) | <0.01 (LiBOB) |
| PC (propylene carbonate) | 132 | No flash point (LiBOB) | 0.0173 (0.13 Torr) | <0.01 (LiBOB) |
| γ-BL (gamma-butyrolactone), | 98 | No flash point (LiBOB) | 0.20 (1.5 Torr) | <0.01 (LiBOB) |
| AN (Acetonitrile) | 6 | 85 (LiBF$_4$) 95 (NaBF$_4$) | 9.71 (88.8 Torr at 25° C.) | 1.5 (LiBF$_4$) 1.2 (NaBF$_4$) |
| EA (Ethyl acetate) + DOL | −3 | 70 (LiBF$_4$) | 9.73 | 1.3 (LiBF$_4$) |
| DME (1,2-dimethoxyethane) | −2 | 66 (LiPF$_6$) 74 (NaPF$_6$) | 6.40 (48 Torr) | 2.1 (LiPF$_6$) 1.6 (LiPF$_6$) |
| VC (vinylene carbonate) | 53.1 | 155 (LiPF$_6$) | 11.98 (89.9 Torr) | 0.9 (LiPF6) |
| TEGDME (tetraethylene glycol dimethylether) | 141 | No flash point (LiPF$_6$) | <0.0013 (<0.01 Torr) | <0.001 |
| FEC (Fluoro ethylene carbonate) | 122 | No flash point (LiPF$_6$) | 0.021 | <0.01 |
| IL (1-ethyl-3-methyl imadazolium TFSI) | 283 | No flash point (NaTFSI) | — | — |

*As per OSHA (Occupational Safety & Health Administration) classification, any liquid with a flash point below 38.7° C. is flammable.
**1 standard atmosphere = 101,325 Pa = 101.325 kPa = 1,013.25 hPa. 1 Torr = 133.3 Pa = 0.1333 kPa

Example 7: Alkali Metal Ion Transference Numbers in Several Electrolytes

The Na$^+$ ion transference numbers of several types of electrolytes (e.g. NaTFSI salt/(EMImTFSI+DME) solvents) in relation to the lithium salt molecular ratio were studied and representative results are summarized in FIG. 3(A) to FIG. 3(D). In general, the Na$^+$ ion transference number in low salt concentration electrolytes decreases with increasing concentration from x=0 to x=0.2-0.35. However, beyond molecular ratios of x=0.2-0.35, the transference number increases with increasing salt concentration, indicating a fundamental change in the Na$^+$ ion transport mechanism. This was explained in the theoretical sub-sections earlier. When Na$^+$ ions travel in a low salt concentration electrolyte (e.g. x<0.2), a Na$^+$ ion can drag multiple solvating molecules along with it. The coordinated migration of such a cluster of charged species can be further impeded if the fluid viscosity is increased due to more salt dissolved in the solvent. In contrast, when an ultra-high concentration of sodium salt with x>0.2 is present, Na$^+$ ions could significantly outnumber the available solvating molecules that otherwise could cluster the sodium ions, forming multi-ion complex species and slowing down their diffusion process. This high Na$^+$ ion concentration makes it possible to have more "free Na$^+$ ions" (non-clustered), thereby providing a higher Na$^+$ transference number (hence, a facile Na$^+$ transport). The sodium ion transport mechanism changes from a multi-ion complex-dominating one (with an overall larger hydrodynamic radius) to single ion-dominating one (with a smaller hydrodynamic radius) having a large number of available free Na$^+$ ions. This observation has further asserted that an adequate number of Na$^+$ ions can quickly move through or from the quasi-solid electrolytes to make themselves readily available to interact or react with a cathode (during discharge) or an anode (during charge), thereby ensuring a good rate capability of a sodium secondary cell. Most significantly, these highly concentrated electrolytes are non-flammable and safe. Combined safety, facile sodium ion transport, and electrochemical performance characteristics have been thus far difficult to come by for all types of sodium and lithium secondary batteries.

Example 8: Lithium Iron Phosphate (LFP) Cathode of a Lithium Metal Battery

LFP powder, un-coated or carbon-coated, is commercially available from several sources. In this example, graphene sheets (RGO) and carbon nanofiber (CNF) were separately included as conductive filaments in an electrode containing LFP particles as a cathode active material and an electrolyte (containing lithium salt dissolved in an organic solvent). The lithium salt used in this example includes lithium borofluoride (LiBF$_4$), and the organic solvents are PC, DOL, DEC, and their mixtures. A wide range of conducting filament volume fractions from 0.1% to 30% was included in this study. The formation of electrode layers was accomplished by using the following sequences of steps:

Sequence 1 (S1): LiBF$_4$ salt was dissolved in a mixture of PC and DOL first to form an electrolyte having a salt concentration of 1.0 M, 2.5 M, and 3.5 M, respectively. (With a concentration of 2.5 M or higher, the resulting electrolyte was no longer a liquid electrolyte. It actually behaves more like a solid and, hence, the term "quasi-solid".) Then, RGO or CNT filaments were dispersed in the electrolyte to form a filament-electrolyte suspension. Mechanical shearing was used to help forming uniform dispersion. (This filament-electrolyte suspension, even with a low salt concentration of 1.0 M, was also quite viscous). LFP particles, the cathode active material, were then dispersed in the filament-electrolyte suspension to form a quasi-solid electrode material.

Sequence 2 (S2): $LiBF_4$ salt was dissolved in a mixture of PC and DOL first to form an electrolyte having a salt concentration of 1.0 M, 2.5 M, and 3.5 M, respectively. Then, LFP particles, the cathode active material, were dispersed in the electrolyte to form an active particle-electrolyte suspension. Mechanical shearing was used to help forming uniform dispersion. (This active particle-electrolyte suspension, even with a low salt concentration of 1.0 M, was also quite viscous). RGO or CNT filaments were then dispersed in the active particle-electrolyte suspension to form a quasi-solid electrode material.

Sequence 3 (S3): First, a desired amount of RGO or CNT filaments was dispersed in the liquid solvent mixture (PC+DOL) containing no lithium salt dissolved therein. Mechanical shearing was used to help forming uniform suspension of conducting filaments in the solvent. The $LiBF_4$ salt and LFP particles were then added into the suspension, allowing $LiBF_4$ salt to get dissolved in the solvent mixture of the suspension to form an electrolyte having a salt concentration of 1.0 M, 2.5 M, and 3.5 M, respectively. Concurrently or subsequently, LFP particles were dispersed in the electrolyte to form a deformable quasi-solid electrode material, which is composed of active material particles and conducting filaments dispersed in a quasi-solid electrolyte (not a liquid electrolyte). In this quasi-solid electrode material, the conducting filaments percolate to form a 3D network of electron-conducting pathways. This 3D conducting network is maintained when the electrode material is shaped into an electrode of a battery.

Figure 6A:
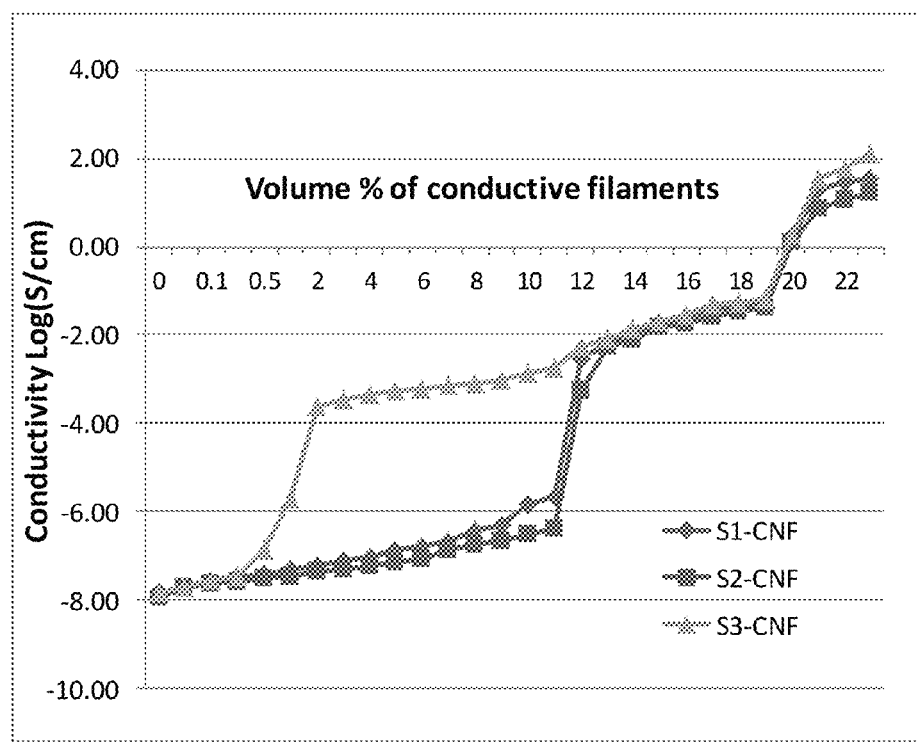
FIG. 6(A) The electrical conductivity (percolation behavior) of conducting filaments in a quasi-solid electrode, plotted as a function of the volume fraction of conductive filaments (carbon nanofibers).
Figure 6B:
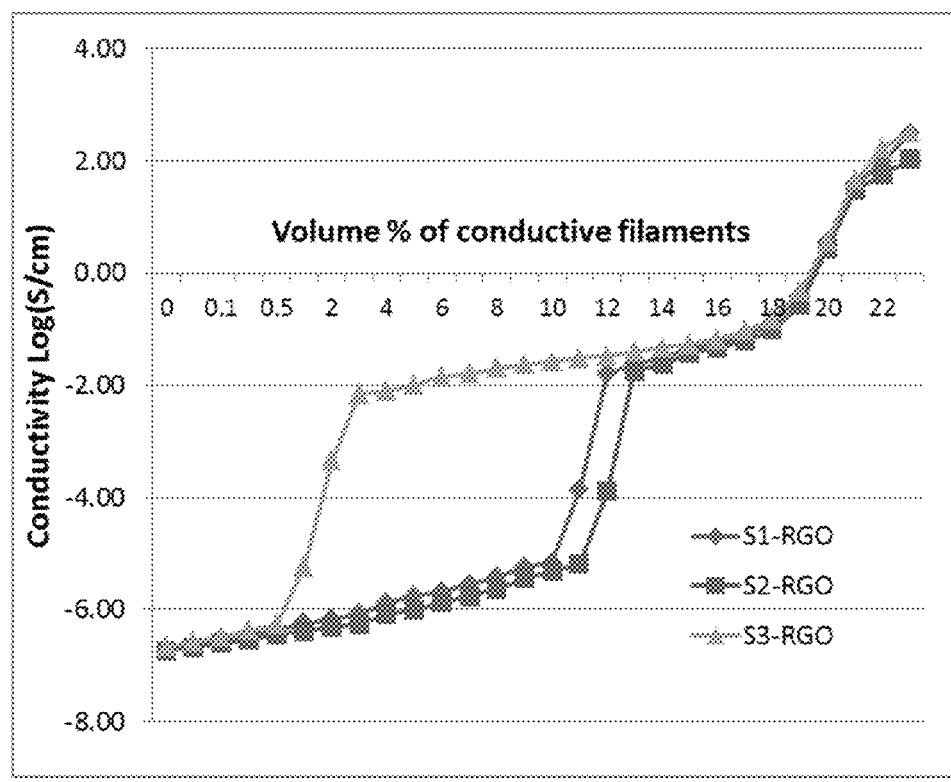
FIG. 6(B) The electrical conductivity (percolation behavior) of conducting filaments in a quasi-solid electrode, plotted as a function of the volume fraction of conductive filaments (reduced graphene oxide sheets).

The electrical conductivity of the electrode was measured using a four-point probe method. The results are summarized in FIG. 6(A) and FIG. 6(B). These data indicate that typically percolation of conductive filaments (CNFs or RGO) to form a 3D network of electron-conducting paths does not occur until the volume fraction of the conductive filaments exceeds 10-12%, except for those electrodes made by following Sequence 3. In other words, the step of dispersing conductive filaments in a liquid solvent must be conducted before the lithium salt or sodium salt is dissolved in the liquid solvent and before active material particles are dispersed in the solvent. Such a sequence also enables the percolation threshold to be as low as 0.5%-2.0%, making it possible to produce a conductive electrode by using a minimal amount of conductive additive and, hence, a higher proportion of active material (and higher energy density). These observations were also found to be true of all types of the electrodes containing active material particles, conductive filaments, and electrolyte thus far investigated. This is a critically important and unexpected process requirement for the preparation of high-performing alkali metal batteries having both high energy density and high power density.

A quasi-solid cathode, a porous separator, and a quasi-solid anode (prepared in a similar manner, but having artificial graphite particles as the anode active material) were then assembled together to form a unit cell, which was then encased in a protective housing (a laminated aluminum-plastic pouch), having two terminals protruding out, to make a battery. Batteries containing a liquid electrolyte (1 M) and quasi-solid electrolytes (2.5 M and 3.5 M) were fabricated and tested.

For comparison purposes, slurry coating and drying procedures were conducted to produce conventional electrodes. One anode and one cathode, and a separator disposed between the two electrodes, were then assembled and encased in an Al-plastic laminated packaging envelop, followed by liquid electrolyte injection to form a prior art lithium battery cell. Battery testing results are summarized in Example 19.

Example 9: $V_2O_5$ as an Example of a Transition Metal Oxide Cathode Active Material of a Lithium Battery $V_2O_5$ powder alone is commercially available. For the preparation of a graphene-supported $V_2O_5$ powder sample, in a typical experiment, vanadium pentoxide gels were obtained by mixing $V_2O_5$ in a LiCl aqueous solution. The Li+ exchanged gels obtained by interaction with LiCl solution (the Li:V molar ratio was kept as 1:1) was mixed with a GO suspension and then placed in a Teflon-lined stainless steel 35 ml autoclave, sealed, and heated up to 180° C. for 12 h. After such a hydrothermal treatment, the green solids were collected, thoroughly washed, ultrasonicated for 2 minutes, and dried at 70° C. for 12 h followed by mixing with another 0.1% GO in water, ultrasonicating to break down nano-belt sizes, and then spray-drying at 200° C. to obtain graphene-embraced composite particulates.

Both $V_2O_5$ powder (with a carbon black powder as a conductive additive) and graphene-supported $V_2O_5$ powder, separately, along with a liquid electrolyte, were then incorporated in a battery using both the presently invented procedure of slurry injection into foam pores of a cathode current collector and the conventional procedure of slurry coating, drying and layer laminating.

Example 10: $LiCoO_2$ as an Example of Lithium Transition Metal Oxide Cathode Active Material for a Lithium-Ion Battery Commercially available $LiCoO_2$ powder and multi-walled carbon nanotubes (MW-CNTs) were dispersed in a liquid electrolyte to form a quasi-solid electrode. Two types of quasi-solid anode were prepared to be coupled with the cathode. One includes graphite particles as the anode active material and the other graphene-embraced Si nano particles as the anode active material. The electrolyte used was EC-VC (80/20 ratio). Each cell contains a quasi-solid anode, a separator layer, and a quasi-solid cathode assembled together and then hermetically sealed.

On a separate basis, $LiCoO_2$ powder, carbon black powder, and PVDF resin binder were dispersed in NMP solvent to form a slurry, which was coated onto both sides of a AL foil current collector and then dried under vacuum to form a cathode layer. Graphite particles and PVDF resin binder were dispersed in NMP solvent to form a slurry, which was coated onto both sides of a Cu foil current collector and then dried under vacuum to form an anode layer. The anode layer, separator, cathode layer were then laminated and encased in an Al-plastic housing, which was injected with a liquid electrolyte to form a conventional lithium-ion battery.

Example 11: Organic Material ($Li_2C_6O_6$) as a Cathode Active Material of a Lithium Metal Battery In order to synthesize dilithium rhodizonate ($Li_2C_6O_6$), the rhodizonic acid dihydrate (species 1 in the following scheme) was used as a precursor. A basic lithium salt, Li$_2$CO$_3$, can be used in aqueous media to neutralize both enediolic acid functions. Strictly stoichiometric quantities of both reactants, rhodizonic acid and lithium carbonate, were allowed to react for 10 hours to achieve a yield of 90%. Dilithium rhodizonate (species 2) was readily soluble even in a small amount of water, implying that water molecules are present in species 2. Water was removed in a vacuum at 180° C. for 3 hours to obtain the anhydrous version (species 3).

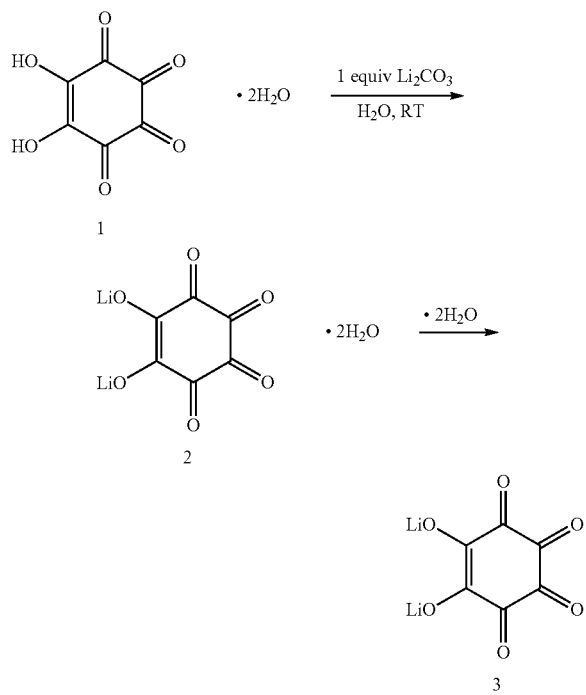

A mixture of a cathode active material (Li$_2$C$_6$O$_6$) and a conductive additive (carbon black, 15%) was ball-milled for 10 minutes and the resulting blend was grinded to produce composite particles. The electrolyte was 1M of lithium hexafluorophosphate (LiPF$_6$) in PC-EC.

It may be noted that the two Li atoms in the formula Li$_2$C$_6$O$_6$ are part of the fixed structure and they do not participate in reversible lithium ion storing and releasing. This implies that lithium ions must come from the anode side. Hence, there must be a lithium source (e.g. lithium metal or lithium metal alloy) at the anode. As illustrated in FIG. 1(D), the anode current collector (Cu foil) is deposited with a layer of lithium (e.g. via sputtering or electrochemical plating, or by using a lithium foil). This was followed by assembling the lithium-coated layer, a porous separator, and a quasi-solid cathode into a cell. The cathode active material and conductive additive (Li$_2$C$_6$O$_6$/C composite particles) were dispersed in the liquid electrolyte. For comparison, the corresponding conventional Li metal cell was also fabricated by the conventional procedures of slurry coating, drying, laminating, packaging, and electrolyte injection.

Example 12: Metal Naphthalocyanine-RGO Hybrid Cathode of a Lithium Metal Battery Copper naphthalocyanine (CuPc)-coated graphene sheets were obtained by vaporizing CuPc in a chamber along with a graphene film (5 nm) prepared from spin coating of RGO-water suspension. The resulting coated film was cut and milled to produce CuPc-coated graphene sheets, which were used as a cathode active material in a lithium metal battery having a lithium metal foil as the anode active material and 1.0 M and 3.0 M of LiClO$_4$ in propylene carbonate (PC) solution as the electrolyte.

Example 13: Preparation of MoS$_2$/RGO Hybrid Material as a Cathode Active Material of a Lithium Metal Battery A wide variety of inorganic materials were investigated in this example. For instance, an ultra-thin MoS$_2$/RGO hybrid was synthesized by a one-step solvothermal reaction of (NH$_4$)$_2$MoS$_4$ and hydrazine in an N, N-dimethylformamide (DMF) solution of oxidized graphene oxide (GO) at 200° C. In a typical procedure, 22 mg of (NH$_4$)$_2$MoS$_4$ was added to 10 mg of GO dispersed in 10 ml of DMF. The mixture was sonicated at room temperature for approximately 10 min until a clear and homogeneous solution was obtained. After that, 0.1 ml of N$_2$H$_4$.H$_2$O was added. The reaction solution was further sonicated for 30 min before being transferred to a 40 mL Teflon-lined autoclave. The system was heated in an oven at 200° C. for 10 h. Product was collected by centrifugation at 8000 rpm for 5 min, washed with DI water and recollected by centrifugation. The washing step was repeated for at least 5 times to ensure that most DMF was removed. Finally, the dried product was mixed with some carbon fibers and a quasi-solid electrolyte to form a deformable quasi-solid cathode.

Example 14: Preparation of Two-Dimensional (2D) Layered Bi$_2$Se$_3$ Chalcogenide Nanoribbons The preparation of (2D) layered Bi$_2$Se$_3$ chalcogenide nanoribbons is well-known in the art. For instance, Bi$_2$Se$_3$ nanoribbons were grown using the vapor-liquid-solid (VLS) method. Nanoribbons herein produced are, on average, 30-55 nm thick with widths and lengths ranging from hundreds of nanometers to several micrometers. Larger nanoribbons were subjected to ball-milling for reducing the lateral dimensions (length and width) to below 200 nm. Nanoribbons prepared by these procedures and either graphene sheets or exfoliated graphite flakes were combined with a quasi-solid electrolyte to form a deformable cathode of a lithium metal battery.

Example 15: MXenes Powder+Chemically Activated RGO

Selected MXenes, were produced by partially etching out certain elements from layered structures of metal carbides such as Ti$_3$AlC$_2$. For instance, an aqueous 1 M NH$_4$HF$_2$ was used at room temperature as the etchant for Ti$_3$AlC$_2$. Typically, MXene surfaces are terminated by O, OH, and/or F groups, which is why they are usually referred to as M$_{n+1}$X$_n$T$_x$, where M is an early transition metal, X is C and/or N, T represents terminating groups (O, OH, and/or F), n=1, 2, or 3, and x is the number of terminating groups. The MXene materials investigated include Nb$_2$CT$_x$, V$_2$CT$_x$, Ti$_3$CNT$_x$, and Ta$_4$C$_3$T$_x$. Typically, 35-95% MXene and 2-35% graphene sheets were mixed in a quasi-solid electrolyte to form a quasi-solid cathode.

Example 16: Preparation of Graphene-Supported MnO$_2$ Cathode Active Material

The MnO$_2$ powder was synthesized by two methods (each with or without the presence of graphene sheets). In one method, a 0.1 mol/L $KMnO_4$ aqueous solution was prepared by dissolving potassium permanganate in deionized water. Meanwhile 13.32 g surfactant of high purity sodium bis(2-ethylhexyl) sulfosuccinate was added in 300 mL iso-octane (oil) and stirred well to get an optically transparent solution. Then, 32.4 mL of 0.1 mol/L $KMnO_4$ solution and selected amounts of GO solution were added in the solution, which was ultrasonicated for 30 min to prepare a dark brown precipitate. The product was separated, washed several times with distilled water and ethanol, and dried at 80° C. for 12 h. The sample is graphene-supported $MnO_2$ in a powder form, which was dispersed in a CNT-containing electrolyte to form a quasi-solid cathode electrode.

Example 17: Graphene-Enhanced Nano Silicon as an Anode Active Material of a Lithium-Ion Battery Graphene-wrapped Si particles were available from Angstron Energy Co., Dayton, Ohio). Quasi-solid anode electrodes were prepared by dispersing pristine graphene sheets (as conductive filaments) in a PC-DOL (50/50 ratio) mixture, followed by dispersing graphene-wrapped Si particles (anode active material), and by dissolving 2.5 M of lithium hexafluorophosphate ($LiPF_6$) in the mixture solvent at 60° C. Then, DOL was removed to obtain a quasi-solid electrolyte containing about 5.0 M of $LiPF_6$ in PC. This put $LiPF_6$ in a supersaturated state since the maximum solubility of $LiPF_6$ in PC is known to be lower than 3.0 M at room temperature.

Example 18: Cobalt Oxide ($Co_3O_4$) Particulates as an Anode Active Material

Although $LiCoO_2$ is a cathode active material, $Co_3O_4$ is an anode active material of a lithium-ion battery since $LiCoO_2$ is at an electrochemical potential of approximately +4.0 volts relative to $Li/Li^+$ and $Co_3O_4$ is at an electrochemical potential of approximately +0.8 volts relative to $Li/Li^+$.

An appropriate amount of inorganic salts $Co(NO_3)_2.6H_2O$ and, subsequently, ammonia solution ($NH_3.H_2O$, 25 wt %) were slowly added into a GO suspension. The resulting precursor suspension was stirred for several hours under an argon flow to ensure a complete reaction. The obtained $Co(OH)_2$/graphene precursor suspension was divided into two portions. One portion was filtered and dried under vacuum at 70° C. to obtain a $Co(OH)_2$/graphene composite precursor. This precursor was calcined at 450° C. in air for 2 h to form the layered $Co_3O_4$/graphene composites, which are characterized by having $Co_3O_4$-coated graphene sheets overlapping one another.

Example 19: Graphene-Enhanced Tin Oxide Particulates as an Anode Active Material Tin oxide ($SnO_2$) nano particles were obtained by the controlled hydrolysis of $SnCl_4.5H_2O$ with NaOH using the following procedure: $SnCl_4.5H_2O$ (0.95 g, 2.7 m-mol) and NaOH (0.212 g, 5.3 m-mol) were dissolved in 50 mL of distilled water each. The NaOH solution was added dropwise under vigorous stirring to the tin chloride solution at a rate of 1 mL/min. This solution was homogenized by sonication for 5 min. Subsequently, the resulting hydrosol was reacted with the GO dispersion for 3 hours. To this mixed solution, few drops of 0.1 M of $H_2SO_4$ were added to flocculate the product. The precipitated solid was collected by centrifugation, washed with water and ethanol, and dried in vacuum. The dried product was heat-treated at 400° C. for 2 h under Ar atmosphere and was used as an anode active material.

Example 20: Preparation and Electrochemical Testing of Various Battery Cells

For most of the anode and cathode active materials investigated, we prepared lithium-ion cells or lithium metal cells using both the presently invented method and the conventional method.

With the conventional method, a typical anode composition includes 85 wt. % active material (e.g., Si- or $Co_3O_4$-coated graphene sheets), 7 wt. % acetylene black (Super-P), and 8 wt. % polyvinylidene fluoride binder (PVDF, 5 wt. % solid content) dissolved in N-methyl-2-pyrrolidinone (NMP). After coating the slurries on Cu foil, the electrodes were dried at 120° C. in vacuum for 2 h to remove the solvent. With the instant method, typically no binder resin is needed or used, saving 8% weight (reduced amount of non-active materials). Cathode layers are made in a similar manner (using Al foil as the cathode current collector) using the conventional slurry coating and drying procedures. An anode layer, separator layer (e.g. Celgard 2400 membrane), and a cathode layer are then laminated together and housed in a plastic-Al envelop. As an example, the cell is then injected with 2.8 M $LiPF_6$ electrolyte solution dissolved in a mixture of ethylene carbonate (EC) and diethyl carbonate (DEC) (EC-DEC, 1:1 v/v). In some cells, ionic liquids were used as the liquid electrolyte. The cell assemblies were made in an argon-filled glove-box.

In the presently invented process, preferably a quasi-solid anode, a porous separator, and a quasi-solid cathode are assembled in a protective housing. The pouch was then sealed.

The cyclic voltammetry (CV) measurements were carried out using an Arbin electrochemical workstation at a typical scanning rate of 1 mV/s. In addition, the electrochemical performances of various cells were also evaluated by galvanostatic charge/discharge cycling at a current density of from 50 mA/g to 10 A/g. For long-term cycling tests, multi-channel battery testers manufactured by LAND were used.

In lithium-ion battery industry, it is a common practice to define the cycle life of a battery as the number of charge-discharge cycles that the battery suffers 20% decay in capacity based on the initial capacity measured after the required electrochemical formation.

Example 21: Representative Testing Results

Figure 7:
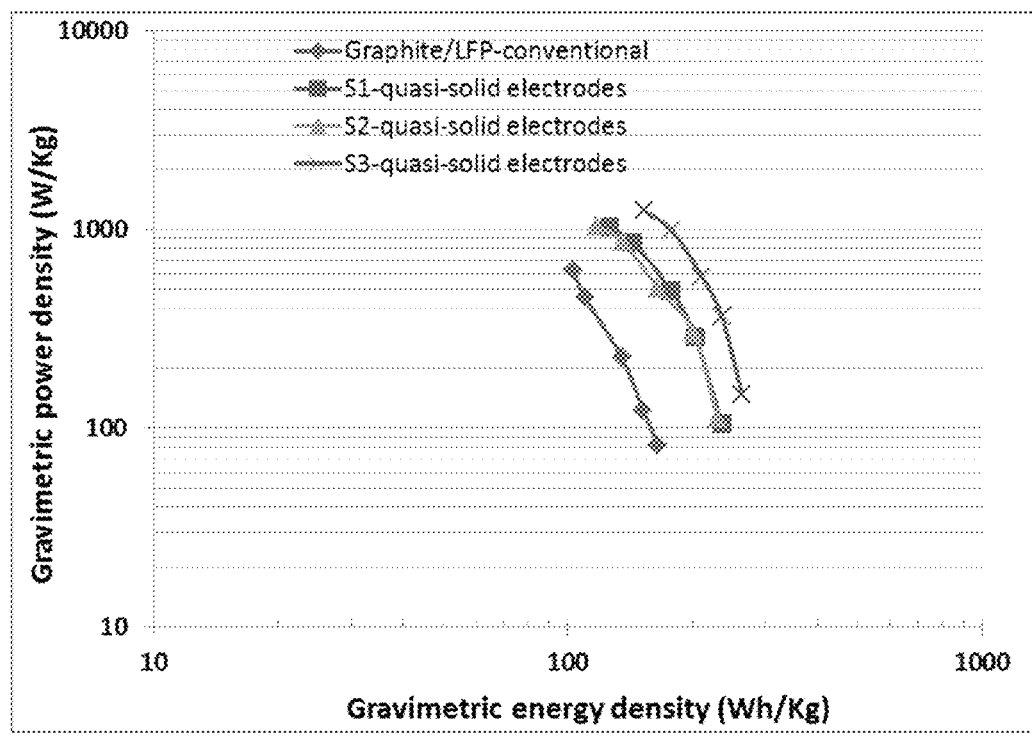
FIG. 7 Ragone plots (gravimetric power density vs. energy density) of lithium-ion battery cells containing graphite particles as the anode active material and carbon-coated LFP particles as the cathode active materials. Three of the 4 data curves are for the cells prepared according to an embodiment of instant invention and the remaining one by the conventional slurry coating of electrodes (roll-coating).

For each sample, several current densities (representing charge/discharge rates) were imposed to determine the electrochemical responses, allowing for calculations of energy density and power density values required of the construction of a Ragone plot (power density vs. energy density). Shown in FIG. 7 are Ragone plots (gravimetric power density vs. energy density) of lithium-ion battery cells containing graphite particles as the anode active material and carbon-coated LFP particles as the cathode active materials. Three of the 4 data curves are for the cells prepared according to an embodiment of instant invention (with Sequence 51, S2, and S3, respectively) and the remaining one by the conventional slurry coating of electrodes (roll-coating). Several significant observations can be made from these data:

The gravimetric energy densities and power densities of the lithium-ion battery cells prepared by the presently invented method are significantly higher than those of their counterparts prepared via the conventional roll-coating method (denoted as "conventional"). A change from an anode thickness of 160 μm (coated on a flat solid Cu foil) to a thickness of 315 μm and a corresponding change in the cathode to maintain a balanced capacity ratio results in a gravimetric energy density increase from 165 Wh/kg to 230 Wh/kg (S1), 235 Wh/kg (S2), and 264 Wh/kg (S3), respectively. Also surprisingly, the battery containing presently invented quasi-solid electrodes having a 3D network of electron-conducting pathways (due to percolation of conductive filaments) deliver a significantly higher energy density and higher power density.

These huge differences cannot be simply ascribed to the increases in the electrode thickness and the mass loading. The differences are likely due to the significantly higher active material mass loading (not just mass loading) and the higher conductivity associated with the presently invented cells, reduced proportion of overhead (non-active) components relative to the active material weight/volume, and surprisingly better utilization of the electrode active material (most, if not all, of the graphite particles and LFP particles contributing to the lithium ion storage capacity due to higher conductivity and no dry pockets or ineffective spots in the electrode, particularly under high charge/discharge rate conditions).

Figure 8:
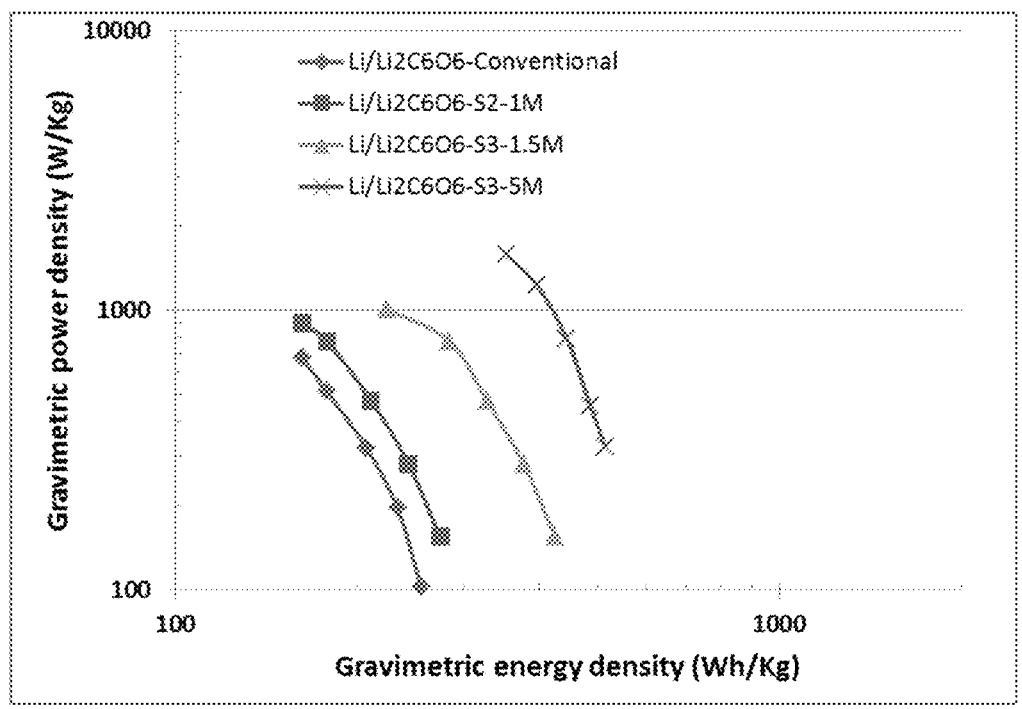
FIG. 8 Ragone plots (gravimetric power density vs. gravimetric energy density) of three cells, each containing graphene-embraced Si nano particles as the anode active material and $LiCoO_2$ nano particles as the cathode active material. The experimental data were obtained from the Li-ion battery cells that were prepared by the presently invented method (following sequences S1 and S3) and that by the conventional slurry coating of electrodes.

FIG. 8 shows the Ragone plots (gravimetric power density vs. gravimetric energy density) of two cells, both containing graphene-embraced Si nano particles as the anode active material and $LiCoO_2$ nano particles as the cathode active material. The experimental data were obtained from the Li-ion battery cells that were prepared by the presently invented method and those by the conventional slurry coating of electrodes.

These data indicate that the gravimetric energy densities and power densities of the battery cells prepared by the presently invented method are significantly higher than those of their counterparts prepared via the conventional method. Again, the differences are huge. The conventionally made cells exhibit a gravimetric energy density of 265 Wh/kg, but the presently invented cells deliver an energy density of 393 Wh/kg (S1) and 421 Wh/kg (S3), respectively. The power densities as high as 1425 W/kg and 1,654 W/kg are also unprecedented for lithium-ion batteries.

These energy density and power density differences are mainly due to the high active material mass loading (>25 mg/cm$^2$ in the anode and >45 mg/cm$^2$ in the cathode) and high electrode conductivity associated with the presently invented cells, reduced proportion of overhead (non-active) components relative to the active material weight/volume, and the ability of the inventive method to better utilize the active material particles (all particles being accessible to liquid electrolyte and fast ion and electron kinetics).

Figure 9:
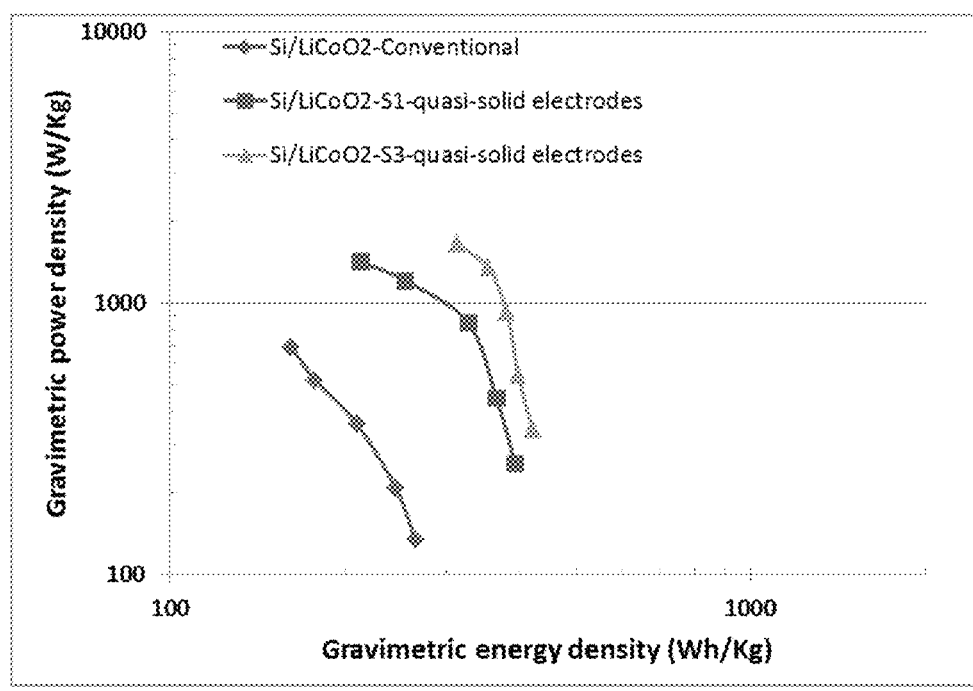
FIG. 9 Ragone plots of lithium metal batteries containing a lithium foil as the anode active material, dilithium rhodizonate ($Li_2C_6O_6$) as the cathode active material, and lithium salt ($LiPF_6$)—PC/DEC as organic electrolyte. The data are the lithium metal cells prepared by the presently invented method (sequences S2 and S3 with 2 different salt concentrations) and that by the conventional slurry coating of electrodes.

Shown in FIG. 9 are Ragone plots of lithium metal batteries containing a lithium foil as the anode active material, dilithium rhodizonate ($Li_2C_6O_6$) as the cathode active material, and lithium salt ($LiPF_6$)—PC/DEC as organic electrolyte (both 1.5 M and 5.0 M). The quasi-solid electrodes were prepared according to the sequences S2 and S3 as described in Example 8. The data are for the three lithium metal cells prepared by the presently invented method and those by the conventional slurry coating of electrodes.

These data indicate that the gravimetric energy densities and power densities of the lithium metal cells prepared by the presently invented method are significantly higher than those of their counterparts prepared via the conventional method. Again, the differences are huge and are likely due to the significantly higher active material mass loading (not just mass loading) and higher conductivity associated with the presently invented electrodes, reduced proportion of overhead (non-active) components relative to the active material weight/volume, and surprisingly better utilization of the electrode active material (most, if not all, of the active material contributing to the lithium ion storage capacity due to higher conductivity and no dry pockets or ineffective spots in the electrode, particularly under high charge/discharge rate conditions).

Quite noteworthy and unexpected is the observation that the gravimetric energy density of the presently invented lithium metal-organic cathode cell is as high as 515 Wh/kg, higher than those of all rechargeable lithium-metal or lithium-ion batteries ever reported (recall that current Li-ion batteries store 150-220 Wh/kg based on the total cell weight). Furthermore, for organic cathode active material-based lithium batteries, a gravimetric power density of 1,576 W/kg and would have been un-thinkable. The cells containing a quasi-solid electrode prepared according to Sequence 3 exhibit significantly higher energy densities and power densities as compared to those of the conventional sequence S2. Also, higher concentration electrolytes (quasi-solid electrolytes) are surprisingly more conducive to achieving higher energy densities and power densities.

Figure 10:
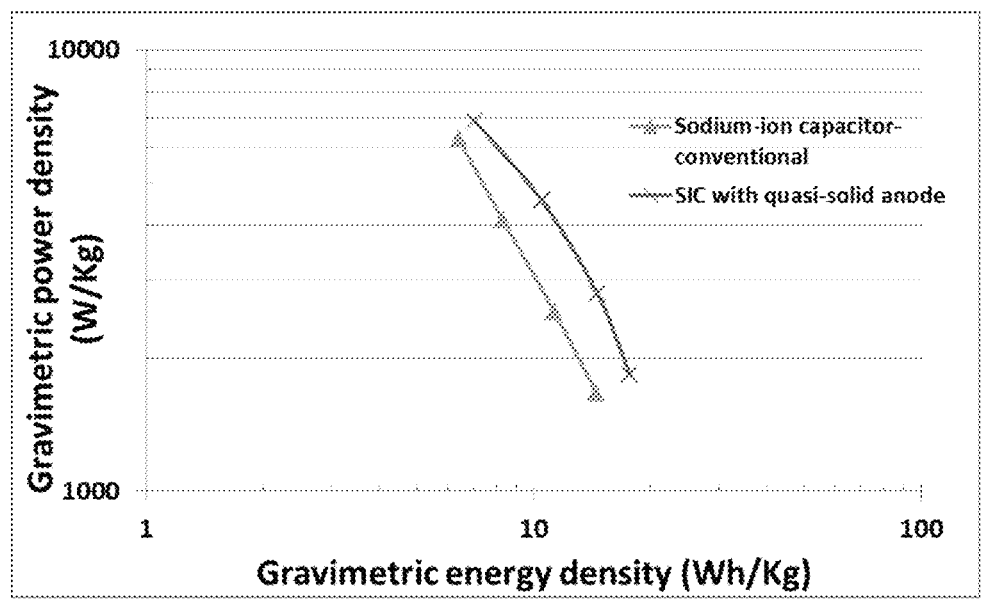
FIG. 10 Ragone plots of two sodium-ion capacitors each containing pre-sodiated hard carbon particles as the anode active material and graphene sheets as the cathode active material; one cell having an anode prepared by conventional slurry coating process and the other cell having a quasi-solid anode prepared according to a presently invented method.

The above performance features of lithium batteries are also observed with corresponding sodium batteries. Due to page limitation, the data for sodium batteries will not be presented here. However, as an example, FIG. 10 indicates Ragone plots of two sodium-ion capacitors each containing pre-sodiated hard carbon particles as the anode active material and graphene sheets as a cathode active material; one cell having an anode prepared by the conventional slurry coating process and the other cell having a quasi-solid anode prepared according to a presently invented method. Again, the quasi-solid electrode-based cell delivers significantly higher energy density and higher power density.

It is of significance to point out that reporting the energy and power densities per weight of active material alone on a Ragone plot, as did by many researchers, may not give a realistic picture of the performance of the assembled supercapacitor cell. The weights of other device components also must be taken into account. These overhead components, including current collectors, electrolyte, separator, binder, connectors, and packaging, are non-active materials and do not contribute to the charge storage amounts. They only add weights and volumes to the device. Hence, it is desirable to reduce the relative proportion of overhead component weights and increase the active material proportion. However, it has not been possible to achieve this objective using conventional battery production processes. The present invention overcomes this long-standing, most serious problem in the art of lithium batteries.

In a commercial lithium-ion batteries having an electrode thickness of 100-200 μm, the weight proportion of the anode active material (e.g. graphite or carbon) in a lithium-ion battery is typically from 12% to 17%, and that of the cathode active material (for inorganic material, such as $LiMn_2O_4$) from 22% to 41%, or from 10% to 15% for organic or polymeric. Hence, a factor of 3 to 4 is frequently used to extrapolate the energy or power densities of the device (cell) from the properties based on the active material weight alone. In most of the scientific papers, the properties reported are typically based on the active material weight alone and the electrodes are typically very thin (<<100 μm, and mostly <<50 μm). The active material weight is typically from 5% to 10% of the total device weight, which implies that the actual cell (device) energy or power densities may be obtained by dividing the corresponding active material weight-based values by a factor of 10 to 20. After this factor is taken into account, the properties reported in these papers do not really look any better than those of commercial batteries. Thus, one must be very careful when it comes to read and interpret the performance data of batteries reported in the scientific papers and patent applications.

We claim:

1. A method of preparing an alkali metal cell having a quasi-solid electrode, the method comprising:
   a) combining a quantity of an active material, a quantity of an electrolyte, and a conductive additive to form a deformable and electrically conductive electrode material, wherein said conductive additive, containing conductive filaments, forms a 3D network of electron-conducting pathways;
   b) forming the electrode material into a quasi-solid electrode, wherein said forming includes deforming the electrode material into an electrode shape without interrupting said 3D network of electron-conducting pathways such that the electrode maintains an electrical conductivity no less than $10^{-6}$ S/cm;
   c) forming a second electrode; and
   d) forming an alkali metal cell by combining the quasi-solid electrode and the second electrode.

2. The method of claim 1, wherein said electrolyte is a quasi-solid electrolyte containing a lithium salt or sodium salt dissolved in a liquid solvent with a salt concentration from 2.5 M to 14 M.

3. The method of claim 1, wherein said electrolyte is a quasi-solid electrolyte containing a lithium salt or sodium salt dissolved in a liquid solvent with a salt concentration from 3.0 M to 11 M.

4. The method of claim 1, wherein said conductive filaments are selected from carbon fibers, graphite fibers, carbon nanofibers, graphite nanofibers, carbon nanotubes, needle coke, carbon whiskers, conductive polymer fibers, conductive material-coated fibers, metal nanowires, metal fibers, metal wires, graphene sheets, expanded graphite platelets, a combination thereof, or a combination thereof with non-filamentary conductive particles.

5. The method of claim 1, wherein said electrode maintains an electrical conductivity from about $10^{-5}$ S/cm to about 300 S/cm.

6. The method of claim 1, wherein said deformable electrode material has an apparent viscosity of no less than about 10,000 Pa-s at an apparent shear rate of 1,000 $s^{-1}$.

7. The method of claim 1, wherein said deformable electrode material has an apparent viscosity of no less than about 100,000 Pa-s at an apparent shear rate of 1,000 $s^{-1}$.

8. The method of claim 1, wherein the quantity of the active material is about 20% to about 95% by volume of the electrode material.

9. The method of claim 1, wherein the quantity of the active material is about 35% to about 85% by volume of the electrode material.

10. The method of claim 1, wherein the quantity of the active material is about 50% to about 75% by volume of the electrode material.

11. The method of claim 1, wherein said step of combining includes dispersing said conductive filaments into a liquid solvent to form a homogeneous suspension prior to adding said active material in said suspension and prior to dissolving a lithium salt or sodium salt in said liquid solvent of said suspension.

12. The method of claim 1, wherein said steps of combining and forming the electrode material into a quasi-solid electrode include dissolving a lithium salt or sodium salt in a liquid solvent to form an electrolyte having a first salt concentration and subsequently removing portion of said liquid solvent to increase the salt concentration to obtain a quasi-solid electrolyte having a second salt concentration higher than the first concentration and higher than 2.5 M.

13. The method of claim 12, wherein said removing does not cause precipitation or crystallization of said salt and said electrolyte is in a supersaturated state.

14. The method of claim 12, wherein said liquid solvent contains a mixture of at least a first liquid solvent and a second liquid solvent and the first liquid solvent is more volatile than the second liquid solvent and wherein said removing portion of said liquid solvent includes removing said first liquid solvent.

15. The method of claim 1, wherein said alkali metal cell is a lithium metal cell or lithium-ion cell and said active material is an anode active material selected from the group consisting of:
   (a) particles of lithium metal or a lithium metal alloy;
   (b) natural graphite particles, artificial graphite particles, meso-carbon microbeads (MCMB), carbon particles, needle coke, carbon nanotubes, carbon nanofibers, carbon fibers, and graphite fibers;
   (c) silicon (Si), germanium (Ge), tin (Sn), lead (Pb), antimony (Sb), bismuth (Bi), zinc (Zn), aluminum (Al), nickel (Ni), cobalt (Co), manganese (Mn), titanium (Ti), iron (Fe), and cadmium (Cd);
   (d) alloys or intermetallic compounds of Si, Ge, Sn, Pb, Sb, Bi, Zn, Al, or Cd with other elements, wherein said alloys or compounds are stoichiometric or non-stoichiometric;
   (e) oxides, carbides, nitrides, sulfides, phosphides, selenides, and tellurides of Si, Ge, Sn, Pb, Sb, Bi, Zn, Al, Fe, Ni, Co, Ti, Mn, or Cd, and their mixtures or composites;
   (f) pre-lithiated versions thereof;
   (g) pre-lithiated graphene sheets; and
   combinations thereof.

16. The method of claim 15, wherein said pre-lithiated graphene sheets are selected from pre-lithiated versions of pristine graphene, graphene oxide, reduced graphene oxide, graphene fluoride, graphene chloride, graphene bromide, graphene iodide, hydrogenated graphene, nitrogenated graphene, boron-doped graphene, nitrogen-doped graphene, chemically functionalized graphene, a physically or chemically activated or etched version thereof, or a combination thereof.

17. The method of claim 1, wherein said alkali metal cell is a sodium metal cell or sodium-ion cell and said active material is an anode active material containing an alkali intercalation compound selected from petroleum coke, amorphous carbon, activated carbon, hard carbon, soft carbon, templated carbon, hollow carbon nanowires, hollow carbon sphere, titanates, $NaTi_2(PO_4)_3$, $Na_2Ti_3O_7$, $Na_2C_8H_4O_4$, $Na_2TP$, $Na_xTiO_2$ (x=0.2 to 1.0), $Na_2C_8H_4O_4$, carboxylate based materials, $C_8H_4Na_2O_4$, $C_8H_6O_4$, $C_8H_5NaO_4$, $C_8Na_2F_4O_4$, $C_{10}H_2Na_4O_8$, $C_{14}H_4O_6$, $C_{14}H_4Na_4O_8$, or a combination thereof.

18. The method of claim 1, wherein said alkali metal cell is a sodium metal cell or sodium-ion cell and said active material is an anode active material selected from the group consisting of:
   a) particles of sodium metal or a sodium metal alloy;
   b) natural graphite particles, artificial graphite particles, meso-carbon microbeads (MCMB), carbon particles, needle coke, carbon nanotubes, carbon nanofibers, carbon fibers, and graphite fibers;
   c) sodium-doped silicon (Si), germanium (Ge), tin (Sn), lead (Pb), antimony (Sb), bismuth (Bi), zinc (Zn), aluminum (Al), titanium (Ti), cobalt (Co), nickel (Ni), manganese (Mn), cadmium (Cd), and mixtures thereof;
   d) sodium-containing alloys or intermetallic compounds of Si, Ge, Sn, Pb, Sb, Bi, Zn, Al, Ti, Co, Ni, Mn, Cd, and their mixtures;
   e) sodium-containing oxides, carbides, nitrides, sulfides, phosphides, selenides, tellurides, or antimonides of Si, Ge, Sn, Pb, Sb, Bi, Zn, Al, Fe, Ti, Co, Ni, Mn, Cd, and mixtures or composites thereof;
   f) sodium salts;
   g) graphene sheets pre-loaded with sodium ions; and combinations thereof.

19. The method of claim 1, wherein said alkali metal cell is a lithium metal cell or lithium-ion cell and said active material is a cathode active material containing a lithium intercalation compound selected from the group consisting of lithium cobalt oxide, doped lithium cobalt oxide, lithium nickel oxide, doped lithium nickel oxide, lithium manganese oxide, doped lithium manganese oxide, lithium vanadium oxide, doped lithium vanadium oxide, lithium mixed-metal oxides, lithium iron phosphate, lithium vanadium phosphate, lithium manganese phosphate, lithium mixed-metal phosphates, metal sulfides, and combinations thereof.

20. The method of claim 1, wherein said electrolyte is selected from an aqueous liquid, an organic liquid, an ionic liquid, or a mixture of an organic liquid and an ionic liquid.

21. The method of claim 1, wherein said alkali metal cell is a lithium metal cell or lithium-ion cell and said active material is a cathode active material containing a lithium intercalation compound or lithium-absorbing compound selected from an inorganic material, an organic or polymeric material, a metal oxide/phosphate/sulfide, or a combination thereof.

22. The method of claim 21, wherein said metal oxide/phosphate/sulfide is selected from a lithium cobalt oxide, lithium nickel oxide, lithium manganese oxide, lithium vanadium oxide, lithium-mixed metal oxide, lithium iron phosphate, lithium manganese phosphate, lithium vanadium phosphate, lithium mixed metal phosphate, transition metal sulfide, or a combination thereof.

23. The method of claim 21, wherein said inorganic material is selected from sulfur, sulfur compound, lithium polysulfide, transition metal dichalcogenide, a transition metal trichalcogenide, or a combination thereof.

24. The method of claim 21, wherein said inorganic material is selected from $TiS_2$, $TaS_2$, $MoS_2$, $NbSe_3$, $MnO_2$, $CoO_2$, an iron oxide, a vanadium oxide, or a combination thereof.

25. The method of claim 21, wherein said metal oxide/phosphate/sulfide contains a vanadium oxide selected from the group consisting of $VO_2$, $Li_xVO_2$, $V_2O_5$, $Li_xV_2O_5$, $V_3O_8$, $Li_xV_3O_8$, $Li_xV_3O_7$, $V_4O_9$, $Li_xV_4O_9$, $V_6O_{13}$, $Li_8V_6O_{13}$, their doped versions, their derivatives, and combinations thereof, wherein $0.1<x<5$.

26. The method of claim 21, wherein said metal oxide/phosphate/sulfide is selected from a layered compound $LiMO_2$, spinel compound $LiM_2O_4$, olivine compound $LiMPO_4$, silicate compound $Li_2MSiO_4$, Tavorite compound $LiMPO_4F$, borate compound $LiMBO_3$, or a combination thereof, wherein M is a transition metal or a mixture of multiple transition metals.

27. The method of claim 21, wherein said inorganic material is selected from: (a) bismuth selenide or bismuth telluride, (b) transition metal dichalcogenide or trichalcogenide, (c) sulfide, selenide, or telluride of niobium, zirconium, molybdenum, hafnium, tantalum, tungsten, titanium, cobalt, manganese, iron, nickel, or a transition metal; (d) boron nitride, or (e) a combination thereof.

28. The method of claim 21, wherein said organic material or polymeric material is selected from Poly(anthraquinonyl sulfide) (PAQS), a lithium oxocarbon, 3,4,9,10-perylenetetracarboxylic dianhydride (PTCDA), poly(anthraquinonyl sulfide), pyrene-4,5,9,10-tetraone (PYT), polymer-bound PYT, Quino(triazene), redox-active organic material, Tetracyanoquinodimethane (TCNQ), tetracyanoethylene (TCNE), 2,3,6,7,10,11-hexamethoxytriphenylene (HMTP), poly(5-amino-1,4-dyhydroxy anthraquinone) (PADAQ), phosphazene disulfide polymer ($[(NPS_2)_3]n$), lithiated 1,4,5,8-naphthalenetetraol formaldehyde polymer, Hexaazatrinaphtylene (HATN), Hexaazatriphenylene hexacarbonitrile ($HAT(CN)_6$), 5-Benzylidene hydantoin, Isatine lithium salt, Pyromellitic diimide lithium salt, tetrahydroxy-p-benzoquinone derivatives ($THQLi_4$), N,N'-diphenyl-2,3,5,6-tetraketopiperazine (PHP), N,N'-diallyl-2,3,5,6-tetraketopiperazine (AP), N,N'-dipropyl-2,3,5,6-tetraketopiperazine (PRP), a thioether polymer, a quinone compound, 1,4-benzoquinone, 5,7,12,14-pentacenetetrone (PT), 5-amino-2,3-dihydro-1,4-dyhydroxy anthraquinone (ADDAQ), 5-amino-1,4-dyhydroxy anthraquinone (ADAQ), calixquinone, $Li_4C_6O_6$, $Li_2C_6O_6$, $Li_6C_6O_6$, or a combination thereof.

29. The method of claim 28, wherein said thioether polymer is selected from Poly[methanetetryl-tetra(thiomethylene)] (PMTTM), Poly(2,4-dithiopentanylene) (PDTP), a polymer containing Poly(ethene-1,1,2,2-tetrathiol) (PETT) as a main-chain thioether polymers, a side-chain thioether polymer having a main-chain consisting of conjugating aromatic moieties, and having a thioether side chain as a pendant, Poly(2-phenyl-1,3-dithiolane) (PPDT), Poly(1,4-di (1,3-dithiolan-2-yl)benzene) (PDDTB), poly(tetrahydrobenzodithiophene) (PTHBDT), poly[1,2,4,5-tetrakis(propylthio)benzene] (PTKPTB, or poly[3,4(ethylenedithio)thiophene] (PEDTT).

30. The method of claim 21, wherein said organic material contains a phthalocyanine compound selected from copper phthalocyanine, zinc phthalocyanine, tin phthalocyanine, iron phthalocyanine, lead phthalocyanine, nickel phthalocyanine, vanadyl phthalocyanine, fluorochromium phthalocyanine, magnesium phthalocyanine, manganous phthalocyanine, dilithium phthalocyanine, aluminum phthalocyanine chloride, cadmium phthalocyanine, chlorogallium phthalocyanine, cobalt phthalocyanine, silver phthalocyanine, a metal-free phthalocyanine, a chemical derivative thereof, or a combination thereof.

31. The method of claim 21, wherein said lithium intercalation compound or lithium-absorbing compound is selected from a metal carbide, metal nitride, metal boride, metal dichalcogenide, or a combination thereof.

32. The method of claim 21, wherein said lithium intercalation compound or lithium-absorbing compound is selected from an oxide, dichalcogenide, trichalcogenide, sulfide, selenide, or telluride of niobium, zirconium, molybdenum, hafnium, tantalum, tungsten, titanium, vanadium, chromium, cobalt, manganese, iron, or nickel in a nanowire, nano-disc, nano-ribbon, or nano platelet form.

33. The method of claim 21, wherein said lithium intercalation compound or lithium-absorbing compound is selected from nano discs, nano platelets, nano-coating, or nano sheets of an inorganic material selected from: (a) bismuth selenide or bismuth telluride, (b) transition metal dichalcogenide or trichalcogenide, (c) sulfide, selenide, or telluride of niobium, zirconium, molybdenum, hafnium, tantalum, tungsten, titanium, cobalt, manganese, iron, nickel, or a transition metal; (d) boron nitride, or (e) a combination thereof; wherein said discs, platelets, or sheets have a thickness less than 100 nm.

34. The method of claim 21, wherein said lithium intercalation compound or lithium-absorbing compound contains nano discs, nano platelets, nano-coating, or nano sheets of a lithium intercalation compound selected from: (i) bismuth selenide or bismuth telluride, (ii) transition metal dichalcogenide or trichalcogenide, (iii) sulfide, selenide, or telluride of niobium, zirconium, molybdenum, hafnium, tantalum, tungsten, titanium, cobalt, manganese, iron, nickel, or a transition metal; (iv) boron nitride, or (v) a combination thereof, wherein said discs, platelets, coating, or sheets have a thickness less than 100 nm.

35. The method of claim 1, wherein said alkali metal cell is a sodium metal cell or sodium-ion cell and said active material is a cathode active material containing a sodium intercalation compound or sodium-absorbing compound selected from an inorganic material, an organic or polymeric material, a metal oxide/phosphate/sulfide, or a combination thereof.

36. The method of claim 35, wherein said metal oxide/phosphate/sulfide is selected from a sodium cobalt oxide, sodium nickel oxide, sodium manganese oxide, sodium vanadium oxide, sodium-mixed metal oxide, sodium/potassium-transition metal oxide, sodium iron phosphate, sodium/potassium iron phosphate, sodium manganese phosphate, sodium/potassium manganese phosphate, sodium vanadium phosphate, sodium/potassium vanadium phosphate, sodium mixed metal phosphate, transition metal sulfide, or a combination thereof.

37. The method of claim 35, wherein said inorganic material is selected from sulfur, sulfur compound, lithium polysulfide, transition metal dichalcogenide, a transition metal trichalcogenide, or a combination thereof.

38. The method of claim 35, wherein said inorganic material is selected from $TiS_2$, $TaS_2$, $MoS_2$, $NbSe_3$, $MnO_2$, $CoO_2$, an iron oxide, a vanadium oxide, or a combination thereof.

39. The method of claim 1, wherein said alkali metal cell is a sodium metal cell or sodium-ion cell and said active material is a cathode active material containing a sodium intercalation compound selected from $NaFePO_4$, $Na_{(1-x)}K_xPO_4$, $Na_{0.7}FePO_4$, $Na_{0.5}VOPO_4F_{0.5}$, $Na_3V_2(PO_4)_3$, $Na_3V_2(PO_4)_2F_3$, $Na_2FePO_4F$, $NaFeF_3$, $NaVPO_4F$, $Na_3V_2(PO_4)_2F_3$, $Na_{1.5}VOPO_4F_{0.5}$, $Na_3V_2(PO_4)_3$, $NaV_6O_{15}$, $Na_xVO_2$, $Na_{0.33}V_2O_5$, $Na_xCoO_2$, $Na_{2/3}[Ni_{1/3}Mn_{2/3}]O_2$, $Na_x(Fe_{1/2}Mn_{1/2})O_2$, $Na_xMnO_2$, $\lambda\text{-}MnO_2$, $Na_xK_{(1-x)}MnO_2$, $Na_{0.44}MnO_2$, $Na_{0.44}MnO_2/C$, $Na_4Mn_9O_{18}$, $NaFe_2Mn(PO_4)_3$, $Na_2Ti_3O_7$, $Ni_{1/3}Mn_{1/3}CO_{1/3}O_2$, $Cu_{0.56}Ni_{0.44}HCF$, NiHCF, $Na_xMnO_2$, $NaCrO_2$, $Na_3Ti_2(PO_4)_3$, $NiCo_2O_4$, $Ni_3S_2/FeS_2$, $Sb_2O_4$, $Na_4Fe(CN)_6/C$, $NaV_{1-x}Cr_xPO_4F$, $Se_zS_y$ (y/z=0.01 to 100), Se, Alluaudites, or a combination thereof, wherein x is from 0.1 to 1.0.

* * * * *